(12) United States Patent
Kim et al.

(10) Patent No.: US 8,249,040 B2
(45) Date of Patent: *Aug. 21, 2012

(54) DEVICE AND METHOD FOR EXCHANGING FRAME MESSAGES OF DIFFERENT LENGTHS IN CDMA COMMUNICATION SYSTEM

(75) Inventors: Young-Ky Kim, Seoul (KR); Jae-Min Ahn, Seoul (KR); Soon-Young Yoon, Seoul (KR); Hee-Won Kang, Seoul (KR); Hyun-Suk Lee, Seoul (KR); Jin-Soo Park, Seoul (KR); Jae-Yoel Kim, Kunpo-shi (KR)

(73) Assignee: Samsung Electronics Co., Ltd. (KR)

( * ) Notice: Subject to any disclaimer, the term of this patent is extended or adjusted under 35 U.S.C. 154(b) by 1918 days.

This patent is subject to a terminal disclaimer.

(21) Appl. No.: 10/726,087

(22) Filed: Dec. 2, 2003

(65) Prior Publication Data
US 2004/0136344 A1   Jul. 15, 2004

Related U.S. Application Data

(63) Continuation of application No. 09/268,242, filed on Mar. 15, 1999, now Pat. No. 6,768,728.

(30) Foreign Application Priority Data

Mar. 14, 1998   (KR) .................................. 1999-9389
Apr. 25, 1998   (KR) ................................ 1998-14878

(51) Int. Cl.
*H04B 7/216*   (2006.01)
(52) U.S. Cl. ........................................ 370/342; 370/335
(58) Field of Classification Search .................. 370/328, 370/342, 335
See application file for complete search history.

(56) References Cited

U.S. PATENT DOCUMENTS 5,056,143 A   10/1991   Taguchi
(Continued)

FOREIGN PATENT DOCUMENTS

JP   8-500475   1/1996
(Continued)

OTHER PUBLICATIONS

Seiichi Sampi et al., "Time Division Mulitiplexed DS/CDMA System Using a Punctured Convolutional Code for Wireless Multimedia Communication Systems", Proceedings of the 1998 IEICE General Conference, Mar. 27-30, 1998.

*Primary Examiner* — Steven Lim
(74) *Attorney, Agent, or Firm* — The Farrell Law Firm, P.C.

(57) ABSTRACT

In a transmission device and method for a CDMA communication system, when a shorter frame message is generated during transmission of a longer frame message, the transmission of the longer frame message is interrupted, whereupon the shorter frame message is immediately transmitted in place of a portion of the longer frame message. In one embodiment, after the longer frame message is interrupted and the shorter frame message is transmitted, only the tail portion of the longer frame message is transmitted thereafter. That is, the replaced portion of the longer frame message is not transmitted following the shorter frame message transmission. In an alternative embodiment, following the shorter frame message transmission, the remainder of the longer frame message, from the point of interruption, is transmitted in its entirety. In the latter case, the longer frame message is delayed by the length of the shorter frame message.

19 Claims, 22 Drawing Sheets

U.S. PATENT DOCUMENTS

| | | | |
|---|---|---|---|
| 5,440,542 A * | 8/1995 | Procter et al. | 370/335 |
| 5,563,895 A * | 10/1996 | Malkamaki et al. | 714/748 |
| 5,619,497 A * | 4/1997 | Gallagher et al. | 370/394 |
| 5,671,224 A * | 9/1997 | Pyhalammi et al. | 370/401 |
| 5,691,995 A * | 11/1997 | Ikeda et al. | 714/786 |
| 5,751,739 A | 5/1998 | Seshadri et al. | |
| 5,799,013 A | 8/1998 | Seshadri et al. | |
| 5,850,393 A * | 12/1998 | Adachi | 370/335 |
| 5,909,434 A * | 6/1999 | Odenwalder et al. | 370/342 |
| 6,031,827 A * | 2/2000 | Rikkinen et al. | 370/330 |
| 6,064,678 A | 5/2000 | Sindhushayana et al. | |
| 6,097,714 A * | 8/2000 | Nagatani et al. | 370/342 |
| 6,335,922 B1 | 1/2002 | Tiedemann, Jr. et al. | |
| 6,768,728 B1 * | 7/2004 | Kim et al. | 370/342 |

FOREIGN PATENT DOCUMENTS

| | | |
|---|---|---|
| JP | 8-509590 | 10/1996 |
| JP | 10-510121 | 9/1998 |
| RU | 2 100 904 | 12/1997 |
| WO | WO 94/29981 | 12/1994 |
| WO | WO 95/23464 | 8/1995 |
| WO | WO 96/17454 | 6/1996 |
| WO | WO 97/02668 | 1/1997 |
| WO | WO 97/37466 | 10/1997 |

* cited by examiner

DEVICE AND METHOD FOR EXCHANGING FRAME MESSAGES OF DIFFERENT LENGTHS IN CDMA COMMUNICATION SYSTEM

PRIORITY

This application is a continuation application of application Ser. No. 09/268,242, filed on Mar. 15, 1999 now U.S. Pat. No. 6,768,728, which claims priority to Korean Patent Applications 1998-9389 flied Mar. 14, 1998 and 1998-14878 filed Apr. 25, 1998, the contents of which are incorporated herein by reference.

BACKGROUND OF THE INVENTION

1. Field of the Invention

The present invention relates generally to wireless telecommunications and more particularly, to a device and method for exchanging frame messages having multiple lengths in a CDMA communication system.

2. Description of the Related Art

At present, mobile communication systems using CDMA (Code Division Multiple Access) technology have become increasingly widespread. Conventional CDMA mobile communication systems based on the TIA/EIA IS-95 CDMA standard transmit control signals for call processing multiplexed with data on a traffic channel carrying voice information. The traffic channel has a fixed frame length of 20 ms. Two techniques have been proposed for transmitting communication signal traffic with control signal traffic: a "blank-and-burst" technique and a "dim-and-burst" technique. The former transmits the whole frame as a control message and the latter transmits the control signal by sharing the frame with main user traffic.

CDMA communication systems that provide multimedia services including packet data service as well as voice service are coming of age. These new systems may separate channels for the voice and data services to flexibly allocate the channels at the user's request. To this end, the CDMA mobile communication system includes a voice traffic channel (or fundamental channel) and a packet traffic channel (or supplemental channel).

Conventionally, for the data service through the fundamental channel and the supplemental channel, CDMA mobile communication systems typically maintain use of the fundamental channel to transmit control signals, even in a state where there is no communication between the base station and mobile station. This results in a waste of channel resources, thereby limiting radio capacity. In addition, the conventional CDMA mobile communication system uses the fixed single frame length of 20 ms without regard to the size of a message to be transmitted, which may cause low throughput and traffic delays.

SUMMARY OF THE INVENTION

It is, therefore, an object of the present invention to provide a transmission/reception device and method for exchanging frame messages of different lengths in a CDMA communication system.

It is another object of the present invention to provide a transmission device and method for intermixing frame messages of different lengths in a CDMA communication system.

It is still another object of the present invention to provide a reception device and method for receiving intermixed messages of a first length frame message and a second length frame message in a CDMA communication system.

In accordance with an illustrative embodiment of the invention, in a transmission device and method for a CDMA communication system, when a shorter frame message is generated during transmission of a longer frame message, the transmission of the longer frame message is interrupted, whereupon the shorter frame message is immediately transmitted in place of a portion of the longer frame message. In one embodiment, after the longer frame message is interrupted and the shorter frame message is transmitted, the tail portion of the longer frame message is transmitted thereafter. That is, the replaced portion of the longer frame message is not transmitted following the shorter frame message transmission. In an alternative embodiment, following the shorter frame message transmission, the remainder of the longer frame message, from the point of interruption, is transmitted in its entirety. In the latter case, the longer frame message is delayed by the length of the shorter frame message. In another alternative embodiment, following the shorter frame message transmission, the remainder of the longer frame message is discarded.

BRIEF DESCRIPTION OF THE DRAWINGS

The above and other objects, features and advantages of the present invention will become more apparent from the following detailed description when taken in conjunction with the accompanying drawings in which like reference numerals indicate like parts. In the drawings.

DETAILED DESCRIPTION OF THE PREFERRED EMBODIMENTS

Figure 1A:
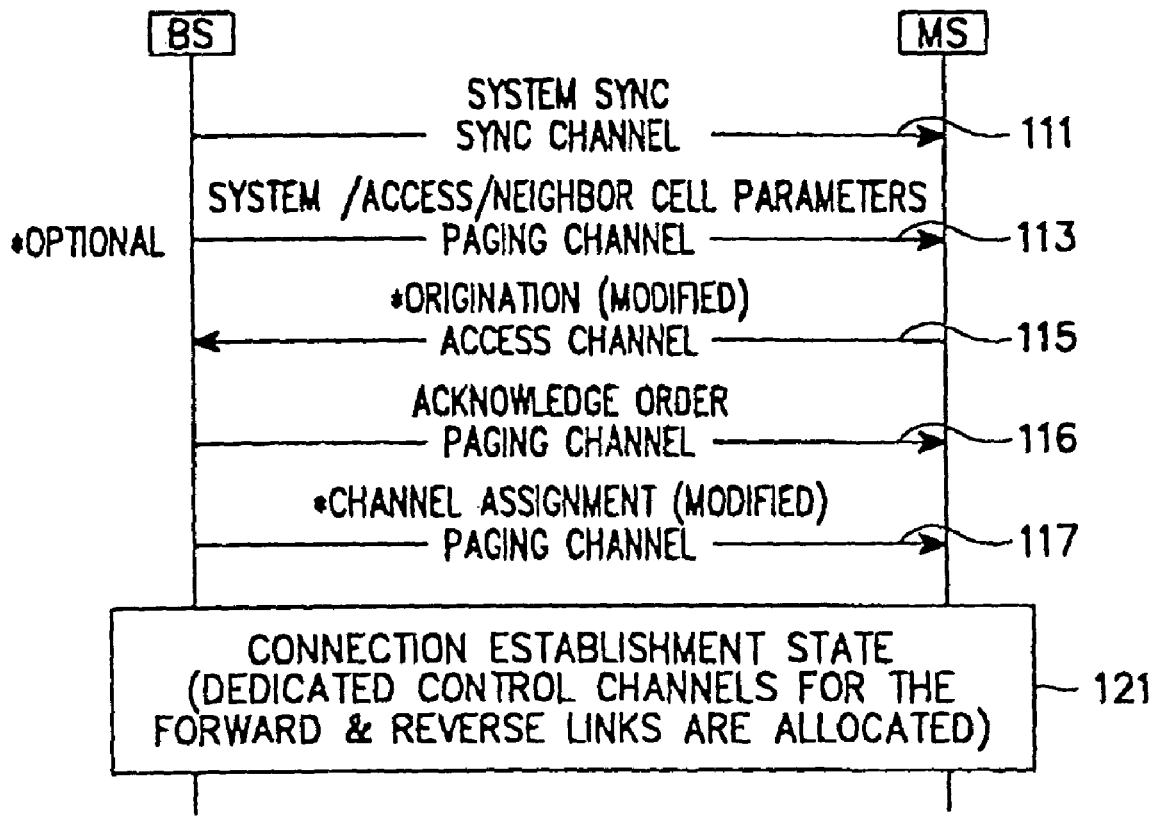
FIG. 1A is a flow diagram illustrating a call setup procedure.

A CDMA mobile communication system according to the present invention includes a fundamental channel for voice service, a supplemental channel for packet data service, and a dedicated control channel (DCCH) by which a mobile station can exclusively exchange control signals with a base station. The fundamental channel and the supplemental channel are considered traffic channels. The DCCH is dedicated for control signal communication with one mobile station at a time, rather than being simultaneously shared among a number of mobile stations. In particular, the dedicated channel is used in exchanging the signals for controlling connection of the traffic channel.

The fundamental channel, the supplemental channel and the dedicated control channel are all dedicated channels. In accordance with the invention, when transceiving a frame message using a dedicated channel, the novel CDMA mobile communication system uses different-length frames according to the size of the frame message. For a short control message, the system generates and transmits a first length frame message; for a long message, the system generates and transmits a second, longer length frame message. A method for exchanging the frame messages of different lengths according to the present invention can be applied to both the dedicated control channel and the traffic channels. The ensuing detailed description presents an example of the method for use with the dedicated control channel; however, it is understood that the method is applicable to the traffic channels as well.

The CDMA mobile communication system of the embodiment to be described controls (restrains) the output of the dedicated control channel when there is no frame message to be transmitted. Only when a frame message does exist is an output path formed for the dedicated control channel. The dedicated control channel is used for exchanging the messages that control connection of the traffic channel between the base station and the mobile station.

Prior to describing the structure of the dedicated control channels, the channels used in the novel CDMA mobile communication system and their uses will first be discussed. In the forward link, which is an RF (radio frequency) link for transmitting signals from the base station to the mobile station, the common channels include a pilot channel, a sync channel and a paging channel (or a common control channel). The user channels in the forward link include a dedicated control channel, a voice traffic channel and a packet traffic channel. In the reverse link which is an RF link for transmitting signals from the mobile station to the base station, the common channel includes an access channel (or a common control channel) and the user channels include a pilot channel, a dedicated control channel, a voice traffic channel and a packet traffic channel.

Thus, channel transceiver devices for the base station and the mobile station in the present embodiment each include transceiver circuitry for transmitting and/or receiving the following information in the respective channels: 1) pilot channel information used for estimating the channel gain and phase and performing cell acquisition and handoff; 2) paging channel information for performing initial synchronization and providing base station information and neighbor cell information; 3) access channel information; 4) voice data in the dedicated fundamental channel; 5) packet data in the dedicated supplemental channel; and 6) dedicated control channel information including setup/release and communication state-related frame messages for the dedicated fundamental channel and the dedicated supplemental channel.

Table 1 lists uses for the respective channels for the forward link and the reverse link according to the services provided.

TABLE 1

| Service | Forward Link Channel | Reverse Link Channel |
| --- | --- | --- |
| Voice Service | Pilot Channel | Pilot Channel |
|  | Voice Traffic Channel | Voice Traffic Channel |
| High Quality Voice Service | Pilot Channel | Pilot Channel |
|  | Voice Traffic Channel | Voice Traffic Channel |
|  | Dedicated Control Channel | Dedicated Control Channel |
| High Speed Packet Data Service | Pilot Channel | Pilot Channel |
|  | Packet Traffic Channel | Packet Traffic Channel |
|  | Dedicated Control Channel | Dedicated Control Channel |
| Multimedia Service | Pilot Channel | Pilot Channel |
|  | Voice Traffic Channel | Voice Traffic Channel |
|  | Packet Traffic Channel | Packet Traffic Channel |
|  | Dedicated Control Channel | Dedicated Control Channel |
|  | Paging Channel (Common Control Channel) | Access Channel (Common Control Channel) |
| Short Message Service | Pilot Channel | Pilot Channel |
|  | Paging Channel (Common Control Channel) | Access Channel (Common Control Channel) |

The CDMA mobile communication system may have an idle mode, a voice mode (or voice traffic channel utilization mode), a packet reservation mode (or packet traffic channel utilization mode), a packet competitive mode (or a common control channel utilization mode) and a combined mode of the above-mentioned modes according to the service states. The dedicated control channel is preferentially used for a call providing a service for the packet reservation mode (i.e., a service using the packet traffic channel). For this case, the dedicated control channel is allocated to the mobile stations using the packet data service. As an alternative, however, the dedicated control channel may be used together with the voice traffic channel for high quality voice service. In this scenario, the dedicated control channel can be shared by several mobile stations, instead of being exclusively used by a particular mobile station.

The call processing for the packet data service is preferably compatible with an IS-95 call processing method. During call setup for the packet data service, the IS-95 origination message and channel allocation message, which are modified to support the packet data service, are used; in call release for the packet data service, an IS-95 release order message modified to support the packet service is used. Exemplary call setup and call release procedures, performed at the request of the mobile station, are shown in FIGS. 1A and 1B, respectively.

Referring to the flow diagram of FIG. 1A, the base station (BS) transmits a system sync message via the sync channel to the mobile station (MS) in step 111. The base station also sends system, access channel and neighbor cell parameters to the mobile station through the paging channel in step 113. The mobile station then outputs an origination message via the access channel in step 115. The base station acknowledges the origination message via the paging channel in step 116, and allocates the traffic channels via the paging channel in step 117. When the traffic channels are assigned for communication between the base station and the mobile station, the system transitions to a connection establishment state in step 121, in which the dedicated control channels for the forward and reverse links are also allocated.

Figure 1B:
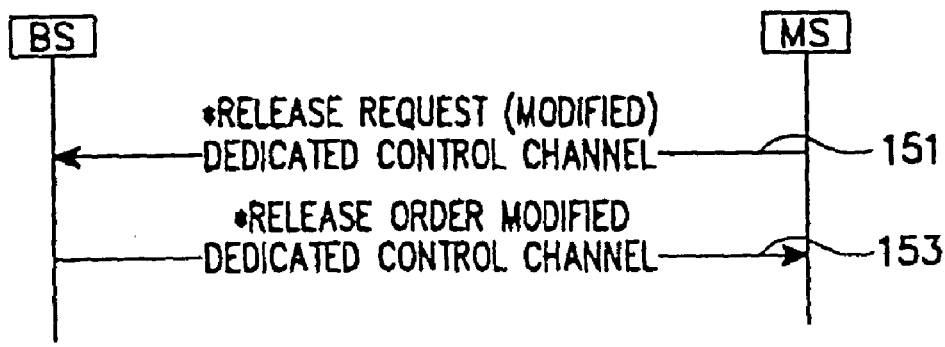
FIG. 1B is a flow diagram illustrating a call release procedure.

Referring to FIG. 1B, to release the call in the connection establishment state, the mobile station sends a frame message for the call release request through the reverse dedicated control channel in step 151, and the base station then outputs a frame message for the call release via the forward dedicated control channel in step 153.

As illustrated in FIGS. 1A and 1B, the differences between the message used in the call control procedure for the packet data service and the message of the IS-95 standard, are as follows: In the origination message (see step 115 of FIG. 1A), the packet data mode is added to the service option; in the channel assignment message (see step 117 of FIG. 1A), packet data control channel allocation information is added to the allocation mode and used as an allocation indicator for the dedicated control channel, and dedicated control channel-related information (a channel identifier and a channel parameter) is included in an annexed field. Further, in the release request and order messages (see steps 151 and 153 of FIG. 1B), the dedicated control channel-related information is included in the annexed field. Since the dedicated control channel is not yet established in the connection establishment procedure, the call setup-related messages are transmitted through the IS-95 channels (i.e., the sync, the paging and the access channels). Once the dedicated control channels for the forward and the reverse links are established by means of the call setup-related messages, the call control messages (e.g., the call release order message) are transmitted through the dedicated control channel.

For the purpose of explication, it is assumed that the dedicated control channel of the present embodiment has the following characteristics: a data rate of 9.6 Kbps, a frame length of 5 ms or 20 ms, and a frame Cyclic Redundancy Check (CRC) consisting of 16 bits (for the 5 ms frame) or 12 bits (for the 20 ms frame). Further, in a dedicated mode, which is not a common mode, several dedicated control channels are employed. The dedicated control channels operate only in a reserved transmission mode, and not in a competitive transmission mode. In the following description, the frame length 5 ms is called a first length of the frame message and the frame length 20 ms is called a second length of the frame message.

Figure 2A:
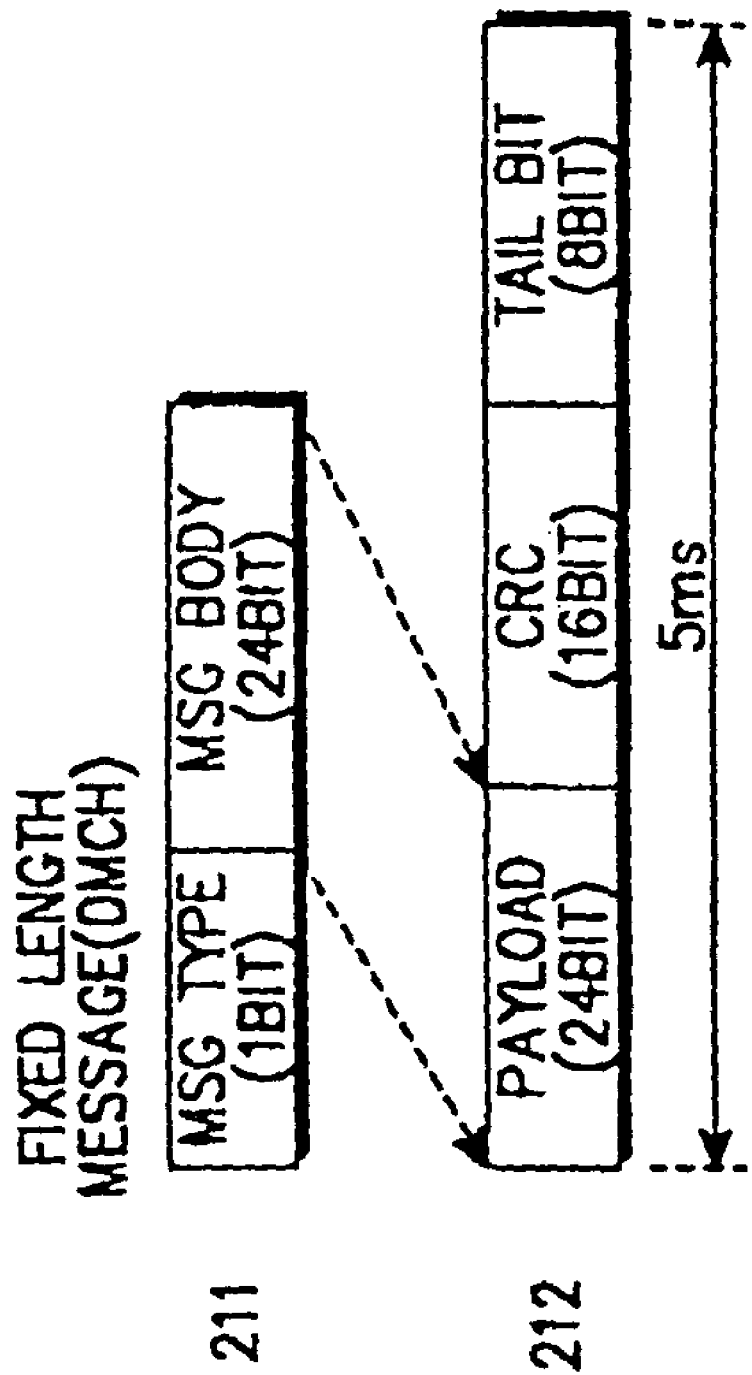
FIG. 2A is a diagram illustrating a structure of a first length frame message for a dedicated control channel according to the present invention.
Figure 2B:
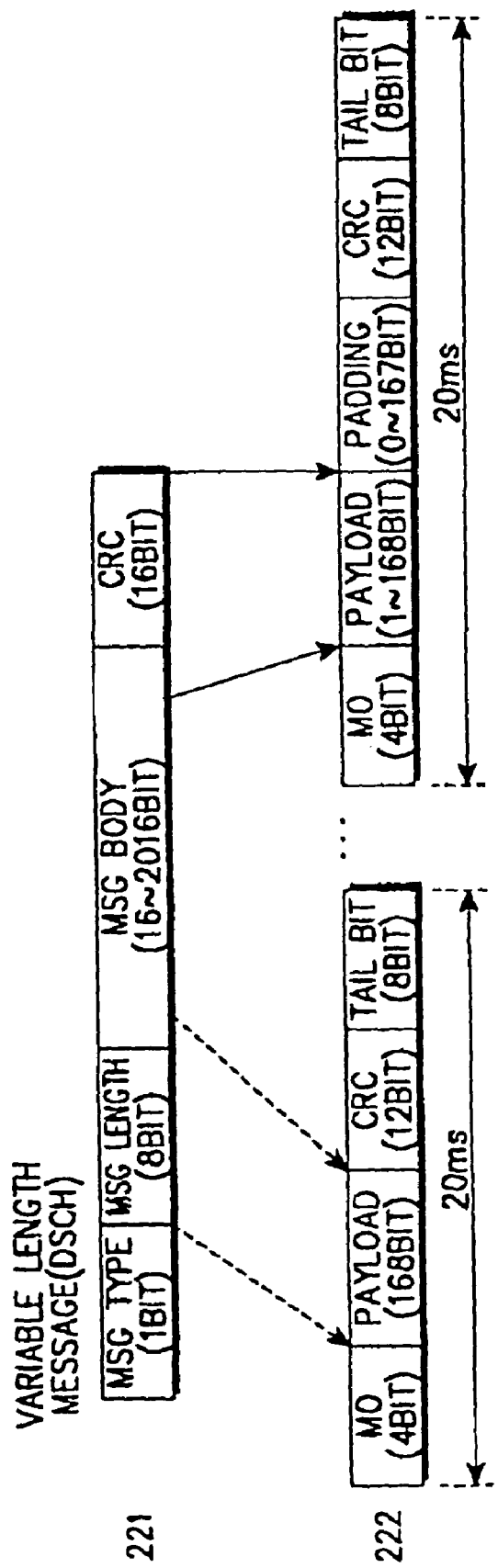
FIG. 2B is a diagram illustrating a structure of a second length frame message for the dedicated control channel according to the present invention.
Figure 2C:
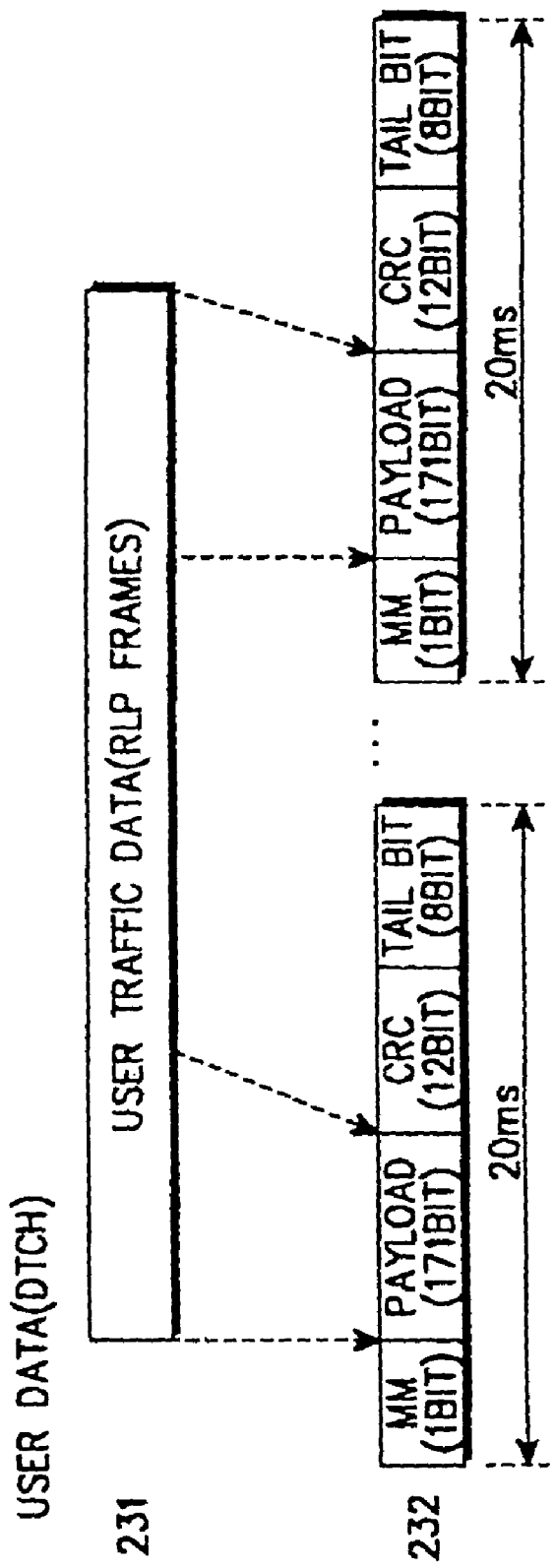
FIG. 2C is a diagram illustrating another structure of a second length frame message for the dedicated control channel according to the present invention.

FIGS. 2A, 2B and 2C illustrate frame structures of a first length frame message for the dedicated control channel, a second length frame message for the dedicated control channel when carrying signaling data, and a second length frame message for the dedicated traffic channel, respectively. The first length frame message of FIG. 2A is 5 ms in duration. Reference numeral 211 denotes a 24 bit fixed length message body frame of an upper layer, preceded by a 1 bit message type flag. Reference numeral 212 denotes a first length frame communicated in a physical layer (i.e., the data bits of frame 212 are wirelessly transmitted). Frame 212 is composed of a 24 bit payload field, a 16 bit CRC field and an 8 bit tail bit field. The information of the 24 bit message body segment of frame 211 in the upper layer is placed in the 24 bit payload frame segment of frame 212 of the physical layer. The fixed length message may be a DMCH (Dedicated MAC (Medium Access Control) Channel) message, a DSCH (Dedicated Signaling Channel) message, or another type of message.

FIG. 2B illustrates the second length frame (20 ms duration), in which reference numeral 221 denotes a variable length control message of the upper layer and reference numeral 222 denotes a sequence of second length (20 ms) control message frames wirelessly communicated in the physical layer. The variable length message may be the DSCH message. The data within the variable length message body of the DSCH message is distributed in the payload segments of the 20 ms frames. The payload segment of each 20 ms frame in the sequence, except for the last 20 ms frame, is 168 bits. The payload segment of the last 20 ms frame can be anywhere between 1 and 168 bits long. Thus, the number of 20 ms frames in the transmitted sequence depends on the number of bits in the message body of the upper layer message.

FIG. 2C illustrates a second length traffic frame of 20 ms duration, in which reference numeral 231 denotes a traffic structure of the upper layer and reference numeral 232 denotes a second length traffic frame communicated in the physical layer. The traffic may be Dedicated Traffic Channel (DTCH) traffic. The user traffic data is distributed among the payload portions of the 20 ms traffic frames in a similar manner as the control message data of FIG. 2B.

The dedicated control channel has the functions of: delivering packet data service-related control messages (e.g., a packet traffic channel allocation message, a layer 3 control message, etc.); delivering the IS-95 control message by encapsulating; delivering a short user packet; and transmitting a power control bit (PCB) through the forward link.

In order to increase the throughput of the CDMA mobile communication system, the frame length of the dedicated control channel is allowed to vary. In particular, a frame length obtained by dividing a reference frame length by an integer should be used to improve the throughput. For example, when the reference frame length is 20 ms, it is preferable to design the system to be able to use a 5 ms or 10 ms frame. In the present embodiment, by way of example only, it is assumed that the 5 ms frame is used. In this way, it is possible to increase the throughput and decrease the traffic delay, as compared with the case where the 20 ms frame shown in FIG. 2B is used. This can also be applied to the traffic channels to efficiently process the short control messages if the traffic channel is used as user's traffic data.

Figure 3A:
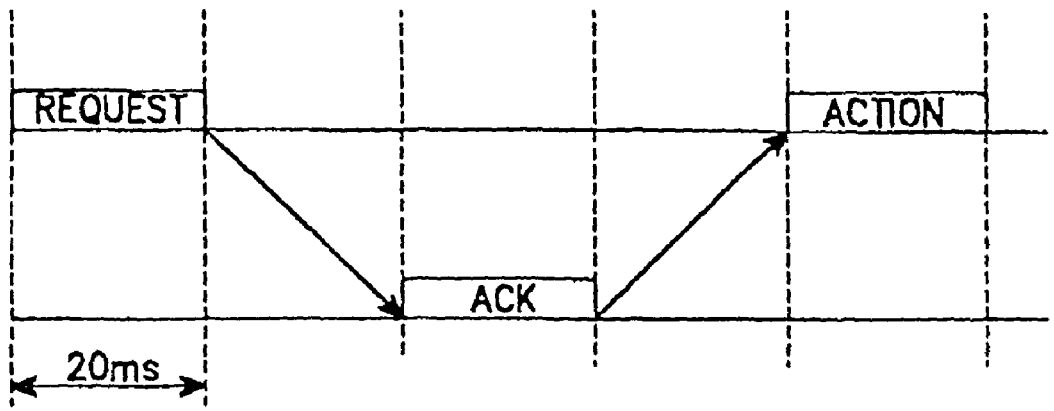
FIG. 3A is a timing diagram illustrating a transmission time when the second length frame message is used for the dedicated control channel in a mobile communication system according to the present invention.
Figure 3B:
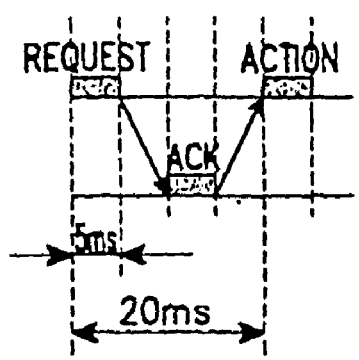
FIG. 3B is a timing diagram illustrating a transmission time when the first length frame message is used for the dedicated control channel in the mobile communication system according to the present invention.

FIG. 3A illustrates a transmission time interval for the second length frame message (i.e., 20 ms frame message), and FIG. 3B illustrates a transmission time interval for the first length frame message (i.e., 5 ms frame message). The time required to send a request message through the dedicated control channel and take corresponding action after reception of an acknowledge, is 80 ms as shown in FIG. 3A when the 20 ms frame is used, and is 20 ms, as shown in FIG. 3B when the 5 ms frame is used. Of course, the latter represents the case where the respective messages are so short as to be loaded into the 5 ms frame, i.e., where the maximum gain in throughput can be obtained with the 5 ms frame. Here, the reason that the throughput is increased is because the signals are efficiently transmitted, thereby increasing the time in which the actual user data can be transmitted.

Figure 8A:
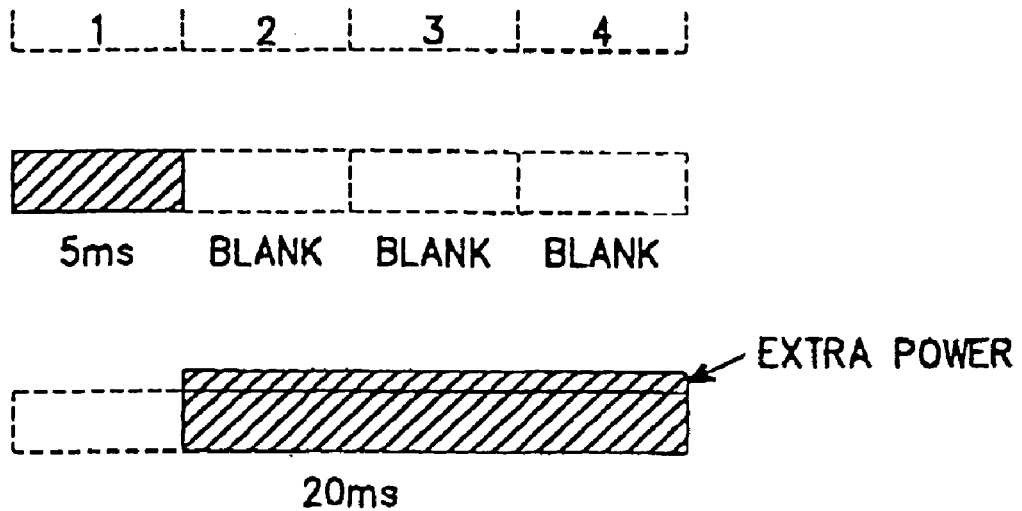
FIGS. 8A and 8B are diagrams illustrating how a first length frame message is intermixed with a second length frame message according to an embodiment of the present invention.
Figure 8B:
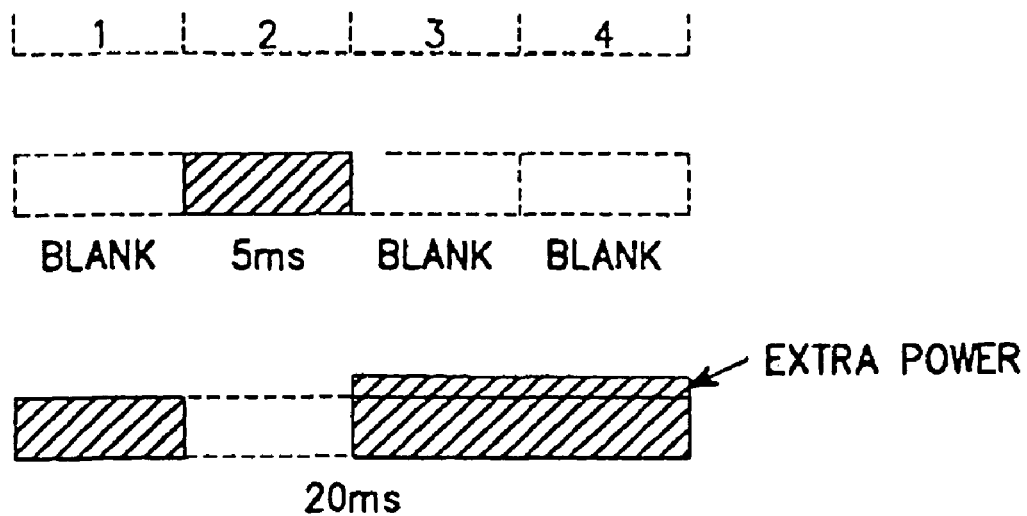

Unlike the method stated above, it is also possible to reduce the transmission time of a control signal by intermixing a first length frame message with a second length frame message. FIGS. 8A and 8B illustrate the transmission powers with respect to time when the first length frame message is intermixed with the second length frame message. (As used herein, the term "intermixed with" is intended to mean that the shorter message is inserted into the longer frame message to either delay the longer frame message, or to permanently replace the corresponding portion of the longer frame message. When a permanent replacement occurs, the replaced portion is not transmitted, and the tail portion of the longer frame message is transmitted undelayed.) As an example to illustrate this technique, the 20 ms message frame is shown divided into four 5 ms message frame durations #1, #2, #3, and #4.

Referring still to FIGS. 8A and 8B, to intermix the 5 ms frame message with the 20 ms frame message, the 5 ms frame can be inserted and transmitted at one of the four divided durations #1-#4 of the 20 ms frame. That is, the 20 ms frame message is interrupted, and the 5 ms frame is inserted. In this case, a 5 ms segment of data of the 20 ms frame message is lost (i.e., not transmitted) in the corresponding interval (duration) where the 5 ms shorter frame is transmitted, but the lost data can be restored at a receiver through decoding of an error correction code.

In order to increase the receiving probability of the 20 ms frame, the transmitter can increase the transmission power in the intervals following the duration where the 5 ms frame data is lost. With this technique, there will be less bit errors in the propagation medium. For example, as shown in FIG. 8A, when the 5 ms frame is intermixed with the 20 ms frame at the first duration #1, the transmitter will increase the transmission power by 33% at the succeeding durations #2, #3 and #4 of the 20 ms frame. Also, as shown in FIG. 8B, when the 5 ms frame is intermixed with the 20 ms frame at the second duration #2, the transmitter will increase the transmission power by 50% at the succeeding durations #3 and #4 of the 20 ms frame. In addition, in order to minimize the influence of the data loss for the 5 ms duration, an interleaver for the 20 ms frame is designed such that the bits corresponding to the lost 5 ms frame data can be dispersed by a row permutation technique. In this manner, it is possible to immediately transmit the 5 ms frame even during transmission of the 20 ms frame, thereby reducing the transmission time. A detailed description will be given with reference to FIGS. 9A through 14B.

Although FIGS. 8A and 8B show examples of continuing to transmit the remaining frame data of the 20 ms frame immediately after the first length frame message is transmitted, it is also possible to delete the remaining frame data of the second length frame message.

In the present embodiment, the dedicated control channel and the traffic channel are used in a control hold state and an active state out of the states for performing the procedures for the packet data service. Shown in Table 2 is the relationship between the "logical" channels and the "physical" channels for the forward and the reverse links. The physical channels are the channels that are wirelessly transmitted. The data carried by the physical channels is derived from the respective logical channels.

TABLE 2

| | Forward Link | | Reverse Link | |
|---|---|---|---|---|
| | Logical CH | Physical CH | Logical CH | Physical CH |
| Control Hold State | DMCH DSCH | Dedicated Control CH | DMCH DSCH | Dedicated Control CH |
| Active State | DMCH DSCH DTCH DTCH | Dedicated Control CH Packet Traffic CH | DMCH DSCH DTCH DTCH | Dedicated Control CH Packet Traffic CH |

In Table 2, the dedicated MAC channel (DMCH) is a forward or reverse channel necessary for transmission of a Medium Access Control (MAC) message, and is a one-to-one channel allocated in the control hold state and the active state for the packet service. The message of the dedicated MAC channel in the logical channel essentially becomes the message of the dedicated control channel in the physical layer. The dedicated signaling channel (DSCH) is a forward or reverse channel necessary for transmission of the layer 3 signaling message, and is a one-to-one channel (i.e., unshared channel) allocated in the control hold state and the active state for the packet service. The dedicated traffic channel (DTCH) is a forward or reverse channel necessary for transmission of the user data, and is a one-to-one channel allocated in the active state for the packet service.

The control hold state in Table 2 means a state where although the dedicated MAC channel DMCH and the dedicated signaling channel DSCH are allocated to the forward and reverse links, an RLP (Radio Link Protocol) frame with the user data packet cannot be exchanged because the dedicated traffic channel DTCH is unestablished. In addition, the active state means a state where the channels DMCH, DSCH and DTCH are allocated to the forward and reverse links so that the RLP frame with the user data packet can be exchanged.

Returning to FIGS. 2A to 2C, these figures show the logical channel message frames or data mapped into the physical channel frames. Reference numerals 211, 221 and 231 denote the logical channel message frames, and reference numerals 212, 222 and 232 denote the physical channel message frames.

The ensuing discussion relates to the structures and operations of the first length frame and the second length frame for the dedicated control channel. The frame length of the dedicated control channel varies dynamically according to the type of the message. At the receiver, the frame length is determined every 5 ms.

In a packet channel connection control mode for transmitting the fixed length message of 5 ms shown in FIG. 2A, request/allocation for the forward and reverse packet traffic channels is made using a 5 ms request/acknowledge message. The forward packet traffic channel allocation which begins at the base station is independent of the reverse packet traffic channel allocation which begins at the mobile station. The connection control messages include a packet traffic channel request message, a packet traffic channel allocation message and a packet traffic channel acknowledge message. These messages are transmitted through the DMCH of the logical channels. Table 3 shows channel allocation message fields for the reverse packet traffic channel, for the first length message frame of 5 ms.

TABLE 3

Reverse Packet Traffic Channel Allocation Message (24 bits)

| Field | Length (bits) |
|---|---|
| Header Information | 5 |
| Sequence | 3 |
| Start Time | 2 |
| Allocated Rate | 4 |
| Allocated Duration | 3 |
| Reserved Bits | 7 |

In Table 3, the respective fields are defined as:
Header Information"—identifier, direction and type (i.e., request and acknowledge) of the message;
"Sequence"—sequence of the message;
"Start Time"—channel use start time;
"Allocated Rate"—rate of the allocated channel;
"Allocated Duration"—channel use duration for the allocated channel.

The 24-bit fixed length message in the form of Table 3 is transmitted with the 5 ms frame, shown in FIG. 2A, of the dedicated control channel.

Figure 4:
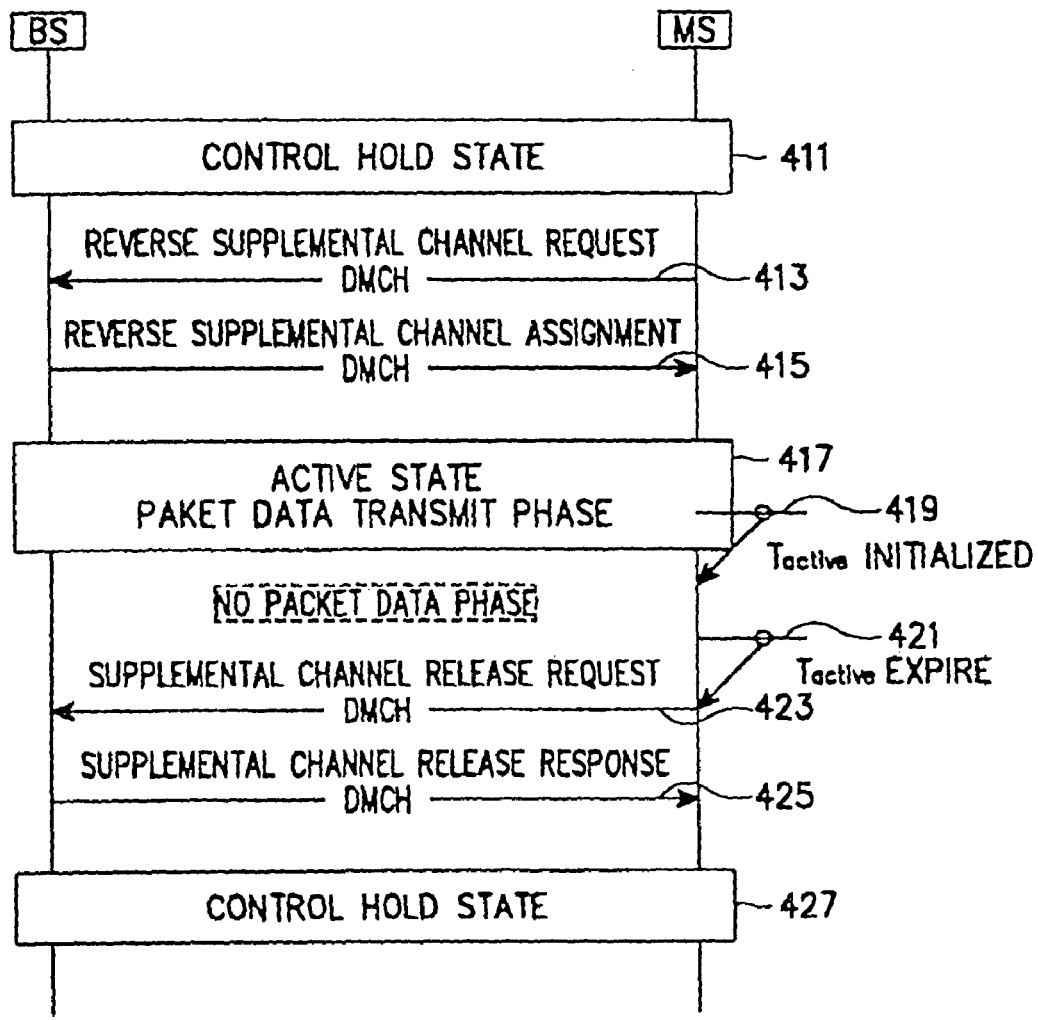
FIG. 4 is a flowchart illustrating allocation and release procedures for a reverse dedicated control channel and a reverse dedicated traffic channel in the mobile communication system according to the present invention.

FIG. 4 is a flowchart illustrating a procedure for allocating and releasing the packet traffic channel through the dedicated control channel, while the system transitions from the control hold state to the active state and then transitions again from the active state to the control hold state. It is assumed in step 411 that the base station and the mobile station maintain the control hold state in which the dedicated control channel is connected. In this state, the mobile station generates a control message for requesting allocation of the reverse packet traffic channel through the dedicated MAC channel DMCH and sends it through the physical channel, in step 413. The base station then generates a control message for allocating the reverse packet traffic channel via the dedicated MAC channel DMCH and sends the generated control message via the physical channel, in step 415. Then, the base station and the mobile station transition to the active state where the packet traffic channel is allocated to communicate the packet data, in step 417. In this active state, the mobile station initializes a $T_{active}$ timer in step 419 to check the time at which transmission of the packet data is discontinued. Here, if transmission of the packet data is continued before a value of the $T_{active}$ timer expires, the active state is maintained and then the step 419 is repeated to initialize the $T_{active}$ timer.

However, if transmission of the packet data is not continued until the value of the $T_{active}$ timer expires, the mobile station perceives this in step 421, and generates a control message for requesting release of the reverse packet traffic channel through the dedicated MAC channel DMCH and sends the generated control message through the physical channel, in step 423. In response to the control message, the base station generates a responsive control message for release of the reverse packet traffic channel via the dedicated MAC channel DMCH and sends the generated control message via the physical channel, in step 425. Subsequently, the base station and the mobile station release the reverse traffic channel and transition to the control hold state, in step 427, preparing for the next state.

As illustrated in FIG. 4, during the procedure of requesting and allocating the reverse packet traffic channel, the mobile station generates the reverse packet traffic channel request message including the requested channel data rate information and sends it to the base station. The base station then analyzes the received message to determine whether or not the requested parameter can be supported and sends, in response to the request message, the reverse packet channel allocation control message of Table 3 to the mobile station according to the determination. When an additional negotiation is required, the above-mentioned request and response procedures may be repeated. Further, if there is no packet data to transmit during the packet data communication, the packet traffic channel releasing process is performed after a lapse of the time set in the $T_{active}$ timer.

In a transmission mode for the variable length frame, the variable length message according to the IS-95 standard is divisionally loaded into the 20 ms frames of the dedicated control channel, as shown in FIG. 2B. Specifically, the transmission modes may include a mode for transmitting the frame without error detection and correction by ACK/NACK (acknowledge/negative acknowledge), a mode where ACK/NACK occurs when an entire variable length message is received and retransmission is performed for the entire variable length message, and a mode where ACK/NACK is performed for the respective frames.

In a user data transmission mode, the RLP frames with the user traffic is divisionally loaded into the 20 ms frames of the dedicated control channel, as shown in FIG. 2C. The user data transmission mode can be used in the event that it is inefficient to establish the packet traffic channel for transmitting the data because there is a small amount of data to transmit.

An embodiment of a physical scheme for transmitting the frames of the dedicated channels in the CDMA mobile communication system using the dedicated control channel described above will now be described.

Figure 5:
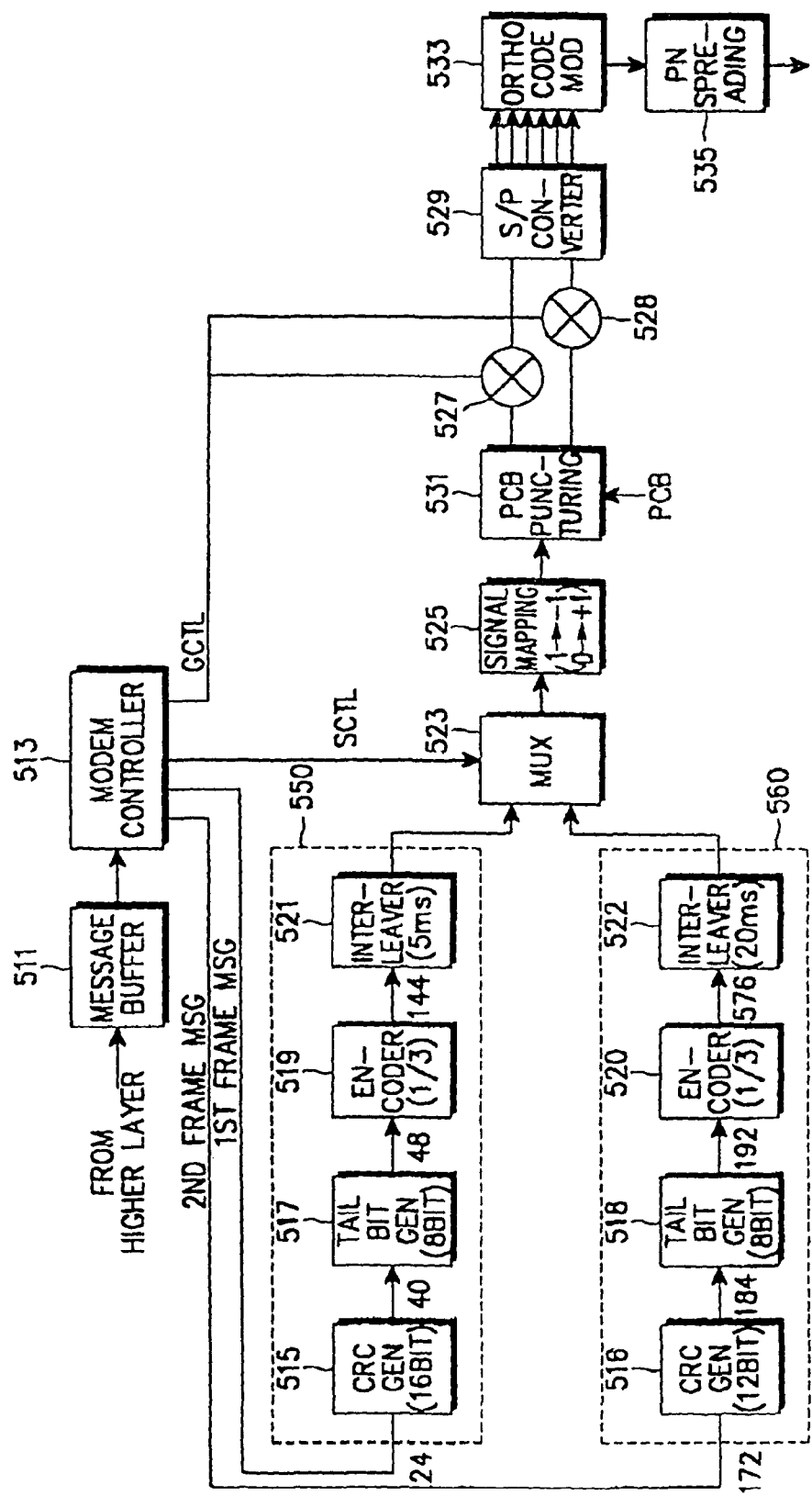
FIG. 5 is a diagram illustrating a transmission device for a forward dedicated control channel in a mobile communication system according to the present invention.

Referring to FIG. 5, there is shown a frame transmission device for the forward dedicated channel in a multicarrier CDMA communication system. A message buffer 511 temporarily stores a frame message communicated through the dedicated channel. The message buffer 511 should have a proper size to store one or more second length frames of 20 ms. Further, the message buffer 511 interfaces a frame message between a higher layer processor (not shown) and a modem controller 513 or between a user data generator (not shown) and the modem controller 513. The higher layer processor sets a flag after storing the frame message in the message buffer 511, and the modem controller 513 clears the flag after reading the frame message, so as to prevent over-writing and over-reading.

After reading the frame message stored in the message buffer 511, the modem controller 513 analyzes a header of the frame message to detect a message type, outputs message data (or payload) to be transmitted through the dedicated channel according to the detected message type, and outputs frame select signals according to the detected message type. Here, the types of the frame data include the first length frame data of FIG. 2A and the second length frame data of FIG. 2B. The modem controller 513 outputs different sized frame messages according to the analysis. That is, for the 5 ms frame data, the modem controller 513 outputs first frame data of 24 bits having the structure of Table 3 at a first output terminal 541; for the 20 ms frame data, the modem controller 513 outputs second frame data of 172 bits at a second output terminal 542. Further, the modem controller 513 determines absence/presence of the frame data to control an output of the dedicated channel. That is, the modem controller 513 generates a first frame select signal upon detection of the first length frame message of 5 ms, and generates a second frame select signal upon detection of the second length frame message of 20 ms. In addition, the modem controller 513 generates a first gain control signal in the event that a 20 ms or 5 ms frame message is present to be transmitted. However, in the event that the 5 ms frame message is intermixed with the 20 ms frame message, the modem controller 513 generates a second gain control signal for increasing the transmission power for the remaining portion of the 20 ms frame message following the duration where the frame messages are intermixed. Moreover, when there is no frame message to transmit, the modem controller 513 generates a third gain control signal for restraining the signal transmission on the dedicated channel.

In short, the modem controller 513 generates the first frame select signal and the first gain control signal, to output the first length frame data at the first output terminal 541. Also, the modem controller 513 generates the second frame select signal and the second gain control signal, to output the second length frame data at the second output terminal 542. In addition, when the 5 ms frame message is intermixed with the 20 ms frame message during transmission of the 20 ms frame message, the modem controller 513 outputs the first and second length frame data at the first and second output terminals, respectively, and generates the first frame select signal for selecting the first length frame message of 5 ms for the duration where the first length frame message is output. After transmission of the first length frame message of 5 ms, the modem controller 513 generates the second frame select signal for selecting the second length frame data for the remaining duration of the 20 ms frame message and generates the second gain control signal for increasing the transmission power of the second length frame data being transmitted at that moment. However, when there is no frame message to transmit, the modem controller 513 generates the third gain control message to block a transmission path of the dedicated control channel.

In the example, the first length frame data refers to a first length bit stream of 5 ms (consisting of 24 bits) and the second length frame data refers to a second length bit stream of 20 ms (consisting of 172 bits).

A CRC (Cyclic Redundancy Check) generator 515 adds 16 CRC bits to the first length frame data of 24 bits output from the modem controller 513 to render it possible to determine the frame quality (i.e., determine whether or not the frame has an error) at the receiver. Specifically, upon reception of the 5 ms frame data, the CRC generator 515 generates 16 CRC bits to output the 40-bit frame data, under the control of the modem controller 513.

A tail bit generator 517 generates tail bits necessary for termination of an error correction code. This tail bit generator 517 generates and adds the tail bits at the end of the first length frame message so as to allow an encoder 519 at the following stage to encode the message by the first length frame unit. Specifically, the tail bit generator 517 generates 8 tail bits and adds them to the output of the CRC generator 515, thereby to output the frame message of 48 bits as represented by reference numeral 212 of FIG. 2A.

The encoder 519 encodes an output of the tail bit generator 517. As an example, encoder 519 can be a convolutional encoder or a turbo encoder using an encoding rate of 1/3 and a constraint length of 9, thus generating 144 encoded bits (or symbols).

An interleaver 521 interleaves the 5 ms frame message output from encoder 519. That is, interleaver 521 rearranges the symbols within the frame by the first frame length unit of 5 ms, so as to improve the tolerance for burst errors. In the present embodiment, the interleaved output of the interleaver 521 will be called a first frame message.

The CRC generator 515, tail bit generator 517, encoder 519 and interleaver 521 constitute a first frame message generator 550 for generating the first frame message by receiving the first frame data.

A CRC generator 516 adds 12 CRC bits to the second length frame data of 172 bits output from the modem controller 513 to render it possible to determine the frame quality (i.e., determine whether or not the frame has an error) at the receiver. Specifically, upon reception of the 20 ms frame data, CRC generator 516 generates 12 CRC bits to output the 184-bit frame data, under the control of the modem controller 513.

A tail bit generator 518 generates tail bits necessary for termination of an error correction code. This tail bit generator 518 generates and adds the tail bits at the end of the second length frame message so as to allow an encoder 520 at the following stage to encode the message by the second length frame unit. Specifically, the tail bit generator 518 generates 8 tail bits and adds them to the output of the CRC generator 516, thereby to output the frame message of 192 bits as represented by reference numeral 222 of FIG. 2B.

The encoder 520 encodes an output of the tail bit generator 518. The encoder 520, used in the embodiment, is a convolutional encoder or a turbo encoder using an encoding rate of 1/3 and a constraint length of 9. Therefore, the encoder 520 generates 576 encoded bits (or symbols). An interleaver 522 interleaves the 20 ms frame message output from the encoder 520. That is, the interleaver 522 rearranges the symbols within the frame by the second frame length unit of 5 ms, so as to improve a tolerance for a burst error. In the present embodiment, the interleaved output of the interleaver 522 will be called a second frame message.

The CRC generator 516, the tail bit generator 518, the encoder 520 and the interleaver 522 constitute a second frame message generator 560 for generating the second frame message by receiving the second frame data.

A multiplexer 523 selects the outputs of the first and second interleavers 521 and 522 according to the frame select signal SCTL output from the modem controller 513. That is, the multiplexer 523 selects the output of the first interleaver 521 in response to the first frame select signal and the output of the second interleaver 522 in response to the second frame select signal. The modem controller 513 and the multiplexer 523 serve as an inserter for intermixing the first frame message with the second frame message when the first length frame message is generated during transmission of the second length frame message or when the first and second frame messages are generated simultaneously.

A signal mapping and multiplexing block 525 maps a frame message output from the multiplexer 523 and multiplexes the mapped frame message to first and second channels. That is, the signal mapping and multiplexing block 525 maps the frame message by converting a control signal of the logic "1" to "−1" and a control signal of the logic "0" to "+1", and outputs the odd-numbered control signals to the first channel and the even-numbered control signals to the second channel.

A control but inserter 531 inserts a control bit into the output of the signal mapping and multiplexing block 525. This inserted control bit may be a power control bit (PCB) for controlling the reverse link power of the mobile station.

Gain controllers 527 and 528 control gains of the corresponding channel signals output from a control bit puncturer 531 according to the gain control signal GCTL output from the modem controller 513. That is, the gain controllers 527 and 528 output the input signals, as they are, in response to the first gain control signal, increase the gains of the input signals to increase the transmission power in response to the second gain control signal, and decrease the gains of the input signals to zero to discontinue an output of the dedicated control channel in response to the third gain control signal. Accordingly, the gain controllers 527 and 528 form or block the paths for the frame message on the dedicated control channel according to the gain control signals output from the modem controller 513. That is, the gain controllers 527 and 528 perform a DTX (Discontinuous Transmission) mode of operation, in which the path of the dedicated control channel is formed according to the gain control signals when there is a frame message to transmit, and the path of the dedicated control channel is blocked when there is no frame message to transmit. In addition, the gain controllers 527 and 528 increase the power of the output signals when the 5 ms frame message is intermixed with the 20 ms frame message under the control of the modem controller 513. As such, gain controllers 527 and 528 constitute a power controller for controlling the transmission power of the signals.

A serial-to-parallel (S/P) converter 529 multiplexes input signals so as to propagate the control signals output from the gain controllers 527 and 528 through a multicarrier signal. An orthogonal code modulator 533 generates an orthogonal code according to the orthogonal code number and length of the allocated channel and orthogonally modulates the frame message by multiplying the frame message by the generated orthogonal code. A Walsh code, a quasi-orthogonal code or an m-chip resistance code can be used for the orthogonal code. A spreading modulator 535 spreads the orthogonally modulated signal output from the orthogonal code modulator 533 by combining it with a spreading sequence such as a pseudo-random noise (PN) sequence.

Figure 6A:
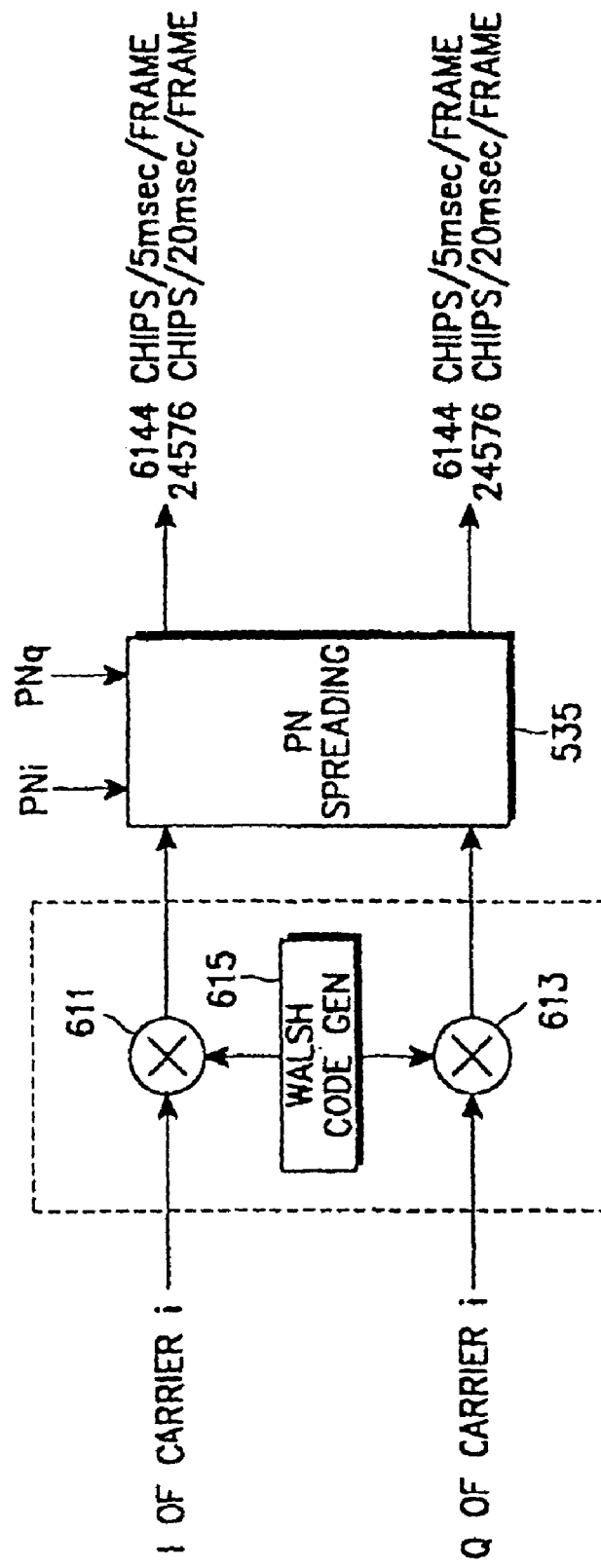
FIGS. 6A to 6C are diagrams illustrating an orthogonal code modulator (533) and a spreading modulator (535) of FIG. 5 according to different embodiments of the invention.
Figure 6B:
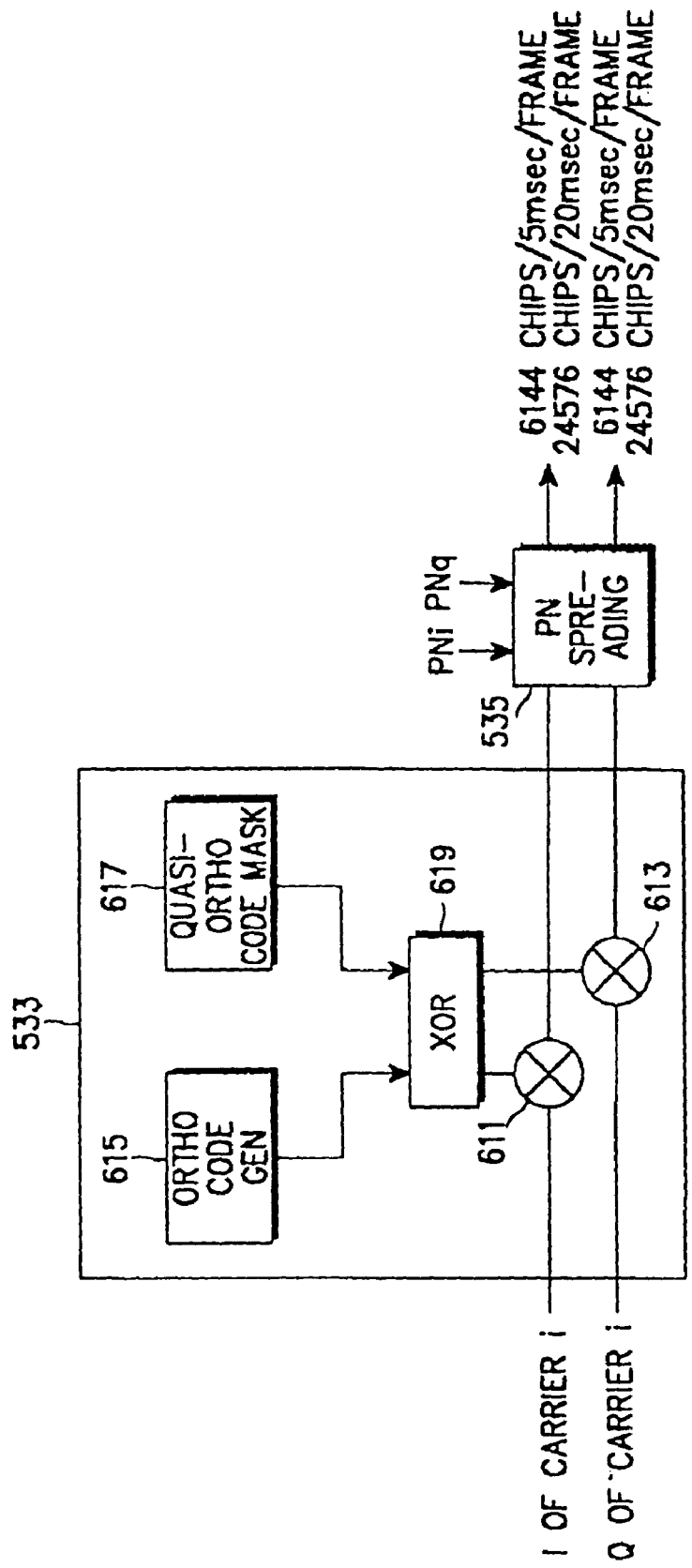
Figure 6C:
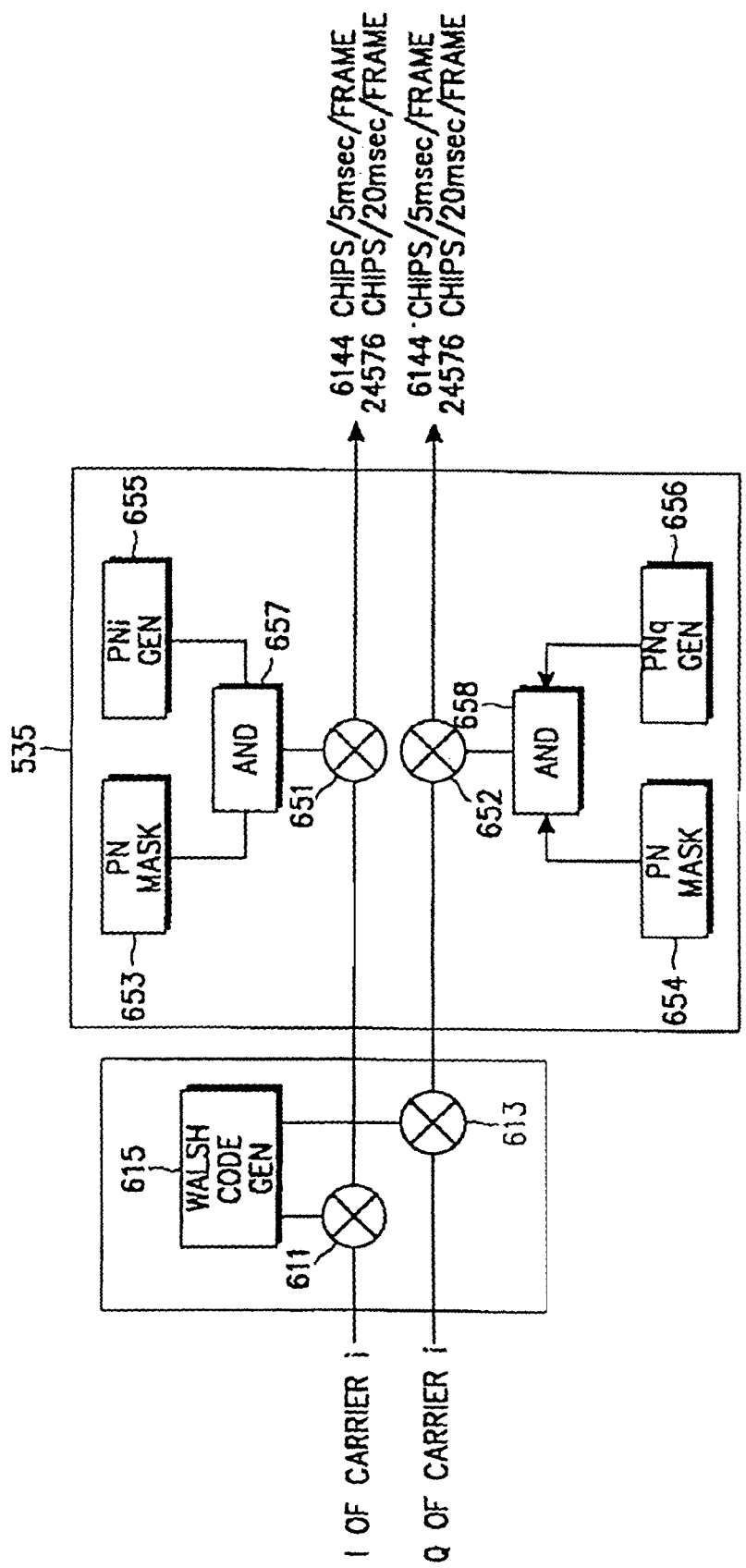

The structures of the orthogonal code modulator 533 and the spreading modulator 535 are shown in FIGS. 6A to 6C.

Referring to FIG. 6A, a Walsh code generator 615 generates a Walsh code for the dedicated control channel. (The Walsh code is the orthogonal code that is the most widely used.) Multipliers 611 and 613 generate orthogonal modulation signals by combining the corresponding I- and Q-channel input signals with the Walsh code output from the Walsh code generator 615.

The spreading modulator 535 spreads the corresponding I- and Q-channel signals output from the multipliers 611 and 613 with PN sequences PNi and PNq provided from a spreading sequence generator (not shown). For the spreading modulator 535, a complex PN spreader may be used.

However, when the Walsh codes are not sufficient in number for the channel separation, quasi-orthogonal codes can be used to expand the number of orthogonal codes. That is, there exists an orthogonal code set according to a predetermined code length: for example, when the code length is 256, there exists a 256×256 Walsh code set from which N 256×256 quasi-orthogonal code sets (where N is a natural number) can be produced systematically. Such quasi-orthogonal code sets have minimized interference between the quasi-orthogonal code channels and the Walsh code channels and have a fixed correlation value between the quasi-orthogonal codes.

Referring to FIG. 6B, a quasi-orthogonal code generator 533 and a spreading modulator 535 are illustrated. Walsh code generator 615 generates a Walsh code according to the Walsh code number and length of the allocated channel, and a quasi-orthogonal code mask 617 generates a quasi-orthogonal code mask signal. An exclusive OR gate 619 XORs the Walsh code and the quasi-orthogonal code mask signal bit by bit to generate a quasi-orthogonal code. Multipliers 611 and 613 multiply the corresponding I- and Q-channel signals by the quasi-orthogonal code output from the XOR gate 619 to spread the frame message of the forward link dedicated channel. The spreading modulator 535 spreads the corresponding I- and Q-channel signals output from the multipliers 611 and 613 with the aforementioned PN sequences PNi and PNq.

In FIG. 6B, the quasi-orthogonal code is generated by multiplying the Walsh code by the quasi-orthogonal code mask signal (or XORing the Walsh code and the quasi-orthogonal code mask signal when the data is represented by "0" and "1"). A suitable quasi-orthogonal code generator is disclosed in detail in U.S. patent application Ser. No. 09/149,924, filed Sep. 9, 1998, entitled "Method for Generating Quasi-Orthogonal Code and Spreader Using The Same in Mobile Communication System", filed by the applicant of the present invention, incorporated herein by reference and based on Korean patent application No. 46402/1997. With use of the quasi-orthogonal code, it is possible to increase the number of the encoded channels by a factor of N, allowing many traffic channel users to use the unique dedicated control channels.

Referring to FIG. 6C, a scheme for generating a quasi-orthogonal code according to another embodiment of the invention is illustrated. Walsh code generator 615 generates a Walsh code for the dedicated channel. Multipliers 611 and 613 multiply the corresponding I- and Q-channel signals by the Walsh code output from the Walsh code generator 615 to generate orthogonal modulation signals. A PN mask 653 generates a PN mask signal, and a PNi generator 655 generates a PN sequence PNi for the I channel. An AND gate 657 ANDs the PN mask signal and the PN sequence PNi bit by bit to generate an I-channel spread signal. A PN mask 654 generates a PN mask signal, and a PNq generator 656 generates a PN sequence PNq for the Q-channel. An AND gate 658 ANDs the PN mask signal and the PN sequence PNq bit by bit to generate a Q-channel spread signal.

In FIG. 6C, the PN sequences generated by AND-ing the specific PN masks with the respective outputs of the PNi and PNq generators 655 and 656 are used in generating the quasi-orthogonal codes. In this way, one quasi-orthogonal code set is generated for each PN mask. Therefore, when N different PN masks are used, it is possible to expand the number of encoded channels, which is similar to the method of generating N quasi-orthogonal code sets using the quasi-orthogonal code generator.

In another embodiment, by shifting the PN sequence by specified chips in the same manner as the method using the PN mask, it is possible to expand the number of the encoded channels, which is similar to the case where the quasi-orthogonal code generator is used.

It is preferable to apply "frame staggering" to the dedicated channels for the forward and reverse links. The term frame staggering, which is used interchangeably with "frame offset", means an operation of offsetting the frames of the respective data channels by a predetermined time on the basis of the system time. In general, the frame offset is applied to obtain the result of dispersing the frame processing load when processing the transmission and reception data at the mobile station or the base station. That is, frame staggering is implemented for efficient use of the common resources (e.g., trunks) for processing the data. For example, in the conventional IS-95 system, the traffic channel frames are offset by a multiple of the power control duration of 1.25 ms, and the maximum frame offset is 18.75 ms which is 15 times the duration 1.25 ms. In the IS-95 system, even though the offset between the base stations is given by 1.25 ms, the power control bits might not be uniformly distributed. Transmission of the non-uniformly distributed power control bits may result in a periodic fluctuation of the overall power. Therefore, in order to prevent the fluctuation due to insertion of the power control bits, the dedicated channel performs coded bit level frame staggering in units of $1.25/12=0.104$ ms to uniformly distribute the power control bits over the 1.25 ms duration.

In light of the foregoing description, operation of the dedicated control channel transmission device will be described hereinbelow. In FIG. 5, the frame length (5 ms or 20 ms) of the message to be transmitted is determined in the modem controller 513. That is, the modem controller 513 determines the frame length by examining the header information representing whether the frame message stored in the message buffer 511 is a 24-bit fixed length frame message or a variable length frame message. When the header information represents the 24-bit fixed length frame message, it is determined that the frame message has the 5 ms frame length. When it represents the variable length frame message, it is determined that the frame message has the 20 ms frame length. The modem controller 513 outputs the input frame data to the first frame message generator 550 or the second frame message generator 560 according to the frame length determination, generates the frame select signal SCTL for selecting the first frame message generator 550 or the second frame message generator 560, and generates the gain control signal GCTL for outputting or restraining the frame message output.

Table 4 lists the control signals generated from the modem controller 513.

TABLE 4

| Frame Message | SCTL | GCTL | Comments |
|---|---|---|---|
| 5 ms | First Frame Select Signal | Fist Gain Control Signal | Output 5 ms Frame Message |
| 20 ms | Second Frame Select Signal | Second Gain Control Signal | Output 20 ms Frame Message |
| 20 ms + 5 ms | First and Second Frame Select Signals | First and Second Gain Control Signal | Output 5 ms Frame Message upon Reception of 5 ms Frame Message During Transmission of 20 ms Frame Message and Continue to Output the 20 ms Frame Message with an Increased Power after Transmission of the 5 ms Frame Message |
| X | X | Third Gain Control Signal | Block an Output Path of the Dedicated Control Channel |

The numerals in sub-blocks 515, 517, 519 and 521 of the first frame message generator 550 and the numerals in sub-blocks 516, 518, 520 and 522 of the second frame message generator 560 represent the bit numbers according to the frame lengths of 5 ms and 20 ms.

In addition, the modem controller 513 controls the dedicated control channel in the DTX mode. That is, in the preferred embodiment, the signaling message and the MAC-related message for the data service are transmitted/received through the dedicated control channel, contributing to an effective use of the channel capacity. The IS-95 system is structured to multiplex the voice traffic and the signaling traffic so that the voice and signaling channels are normally opened for the data service. However, since the dedicated channel of the invention operates in the DTX mode, it is not necessary to normally open the dedicated control channel for the control signal. When there is no signal information to transmit, it is possible to suppress a transmission power in a DTX gain controller, thus effectively utilizing the radio capacity.

As to the DTX transmission mode of operation, when it is perceived that the message buffer 511 has no control message to transmit, the modem controller 513 generates the third gain control signal so that the gain controllers 527 and 528 maintain an output of the dedicated control channel to be 0. That is, the modem controller 513 generates the first gain control signal (of a predefined gain) or the second gain control signal (which is determined according to the position where the 5 ms frame message is output) when there is a frame message to transmit, and generates the third gain control signal (GCTL=0) when there is no frame message to transmit. The gain controllers 527 and 528 may be positioned following a spreading stage. Further, although the invention has been described with reference to an embodiment performing the DTX mode for the dedicated control channel using the gain controllers 527 and 528, it is also possible to block the signal path using the multiplexer 523 when there is no control signal to transmit to the dedicated control channel.

Furthermore, it is also possible to intermix the 5 ms frame message with the 20 ms frame message in transmitting the frame messages, as shown in FIGS. 8A and 8B. When the 5 ms frame message and the 20 ms frame message are input simultaneously at the duration #1 as shown in FIG. 8A, the modem controller 513 applies the 5 ms frame data to the first frame message generator 550 and the 20 ms frame data to the second frame message generator 560. For duration #1, the first and second interleavers 521 and 522 output the 5 ms and 20 ms frame messages, respectively. The multiplexer 523 then selects the output of the first interleaver 521 in response to the first frame select signal, and the gain controllers 527 and 528 transfer the output signals, as they are, in response to the first gain control signal. Accordingly, for duration #1, the 5 ms frame message is output at its original input signal level. After transmission of the 5 ms frame message for duration #1, the multiplexer 523 selects the output of the second interleaver 522 in response to the second frame select signal, and the gain controllers 527 and 528 increase the transmission power of the 20 ms frame message output from the multiplexer 523 in response to the second gain control signal. For the remaining durations #2, #3 and #4, the transmission power of the 20 ms frame data is increased by 33% as compared with the input power level. After duration #4, the gain controllers 527 and 528 block the output path of the frame message in response to the third gain control signal (GCTL=0).

In FIG. 8B, the 5 ms frame message is received at duration #2 during transmission of the 20 ms frame message received at duration #1. In this case, for the duration #1, the modem controller 513 applies the 20 ms frame message to the second frame message generator 560 and generates the second frame select signal and the first gain control signal. For duration #2, the modem controller 513 applies the 5 ms frame message to the first frame message generator 550 and the 20 ms frame message to the second frame message generator 560 and generates the first frame select signal and the first gain control signal. As a result, the 20 ms frame message is output at its original signal level for the duration #1, and the 5 ms frame message is output in the original signal level for the duration #2. After the duration #2, the multiplexer 523 selects the output of the second interleaver 522 in response to the second frame select signal, and the gain controllers 527 and 528 increase the gain of the 20 ms frame message output from the multiplexer 523 in response to the second gain control signal. For the remaining durations #3 and #4, the gain is increased by 50% as compared with the input signal level. After duration #4, the gain controllers 527 and 528 block the output path of the frame message in response to the third gain control signal (GCTL=0).

A further description will be given as to the methods of intermixing the frames when it is necessary to transmit the 5 ms frame message during transmission of 20 ms frame message or when the 5 ms frame message and the 20 ms frame message are generated simultaneously.

In a first intermixing method, when the shorter frame message is generated during transmission of the longer frame message, the shorter frame message is transmitted in its entirety (e.g., in a 5 ms interval), delaying transmission of the longer frame message, and the remaining portion of longer frame message is transmitted after transmission of the shorter frame message. In this method, since the short frame message and the longer frame message are wholly transmitted, performance degradation may not occur during decoding at the receiver. However, when there is a time limit in transmitting the frame messages, the sum of the two frame messages will exceed the time limit.

In a second intermixing method, when the shorter frame message is generated during transmission of the longer frame message, the shorter frame message is transmitted in place of a portion of the longer frame message, and the portion that was replaced is never transmitted. The tail end of the longer frame message is then transmitted in an undelayed fashion. In this method, the data of the longer frame message may be lost at the replaced portion, causing decoding performance degradation. However, this problem can be minimized depending on how to design a symbol distributor for the longer frame message.

For the convolutional code, the decoding performance depends on the position of the replaced symbols in one frame duration. By searching for a position having the best decoding performance for the replaced frame message and replacing the frame message at this position, the problem of the decoding performance degradation may be solved.

For that purpose, it is necessary to search for the position having the best decoding performance when the longer frame message is replaced by as much as the shorter frame message length. To this end, it is necessary to determine the replacement position (i.e., "puncturing" position) and measure the decoding performance for the position. In measuring the decoding performance of the convolutional code, the following parameters are used: a free distance $d_{free}$ representing the minimum Hamming distance between encoded symbols, a transfer function representing an upper limit formula of a bit error rate and a distribution of the Hamming distance between the symbols (See "Error Correction Coding: Fundamentals and Application"-Shu Lin/Daniel J. Costello, Jr.).

The parameters are measured for the respective replacement positions to search for the preferable replacement position. If it is possible to move the searched positions to the position to be punctured in the intermixing process, the problem which arises in the intermixing process may be solved. As for the signal power loss problem, the power loss can be compensated for by increasing the signal power of the remaining portion of the longer frame message as much as the lost power.

The searched replacement positions are measured through experiments to verify the performance. Thereafter, the symbol distributor is designed for moving the symbols at the searched positions to the positions to be punctured in the intermixing process. An interleaver may be used for the symbol distributor.

In the embodiment, it is assumed that the 5 ms frame is intermixed with the 20 ms frame, and the 20 ms frame of 192 bits is encoded into the convolutional code of a coding rate 1/3. Here, the number of the encoded symbols is 576. In the following description, the 5 ms frame refers to the first length frame message having the frame length of 5 ms, and the 20 ms frame refers to the second length frame message having the frame length of 20 ms.

Figure 9A:
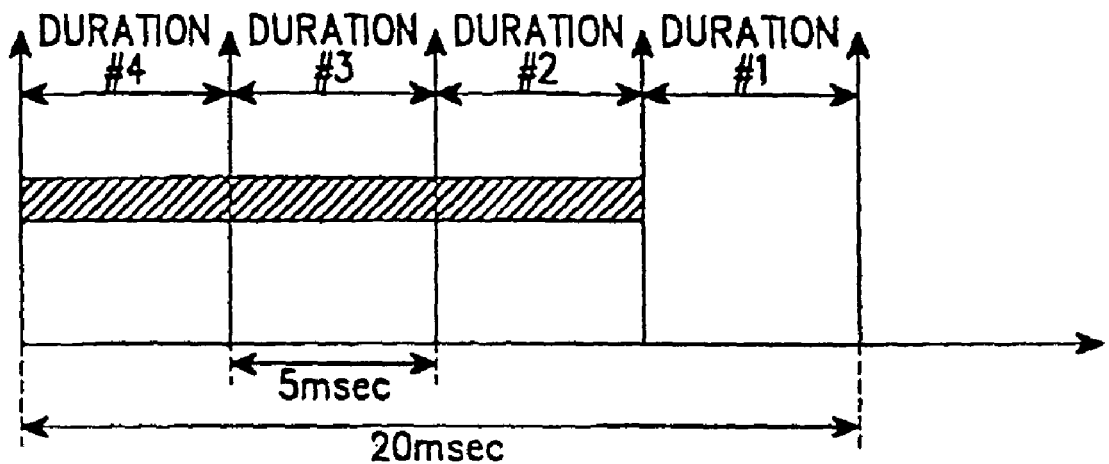
FIGS. 9A through 9D show different ways of intermixing a 20 ms frame with a 5 ms frame according to the present invention.
Figure 9B:
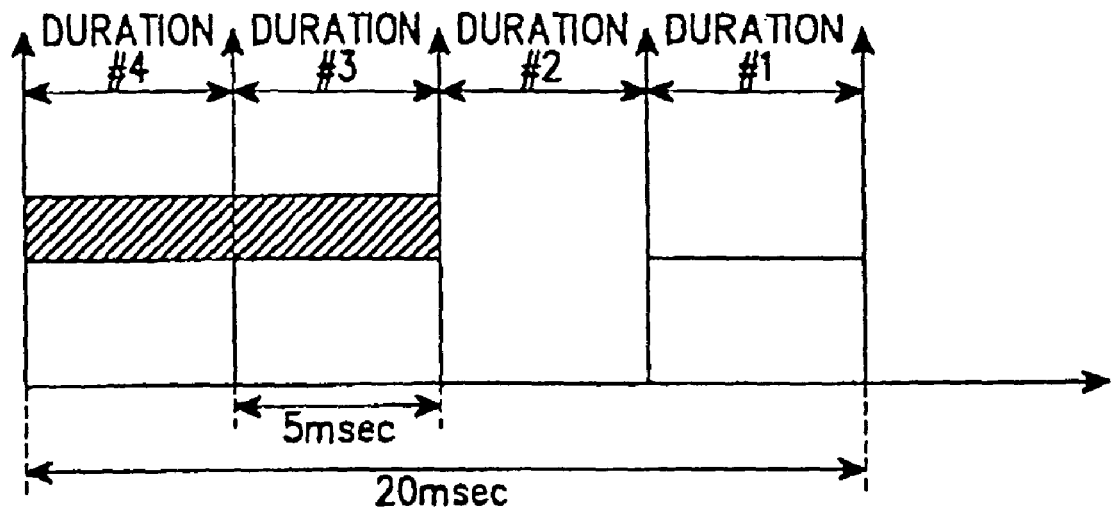
Figure 9C:
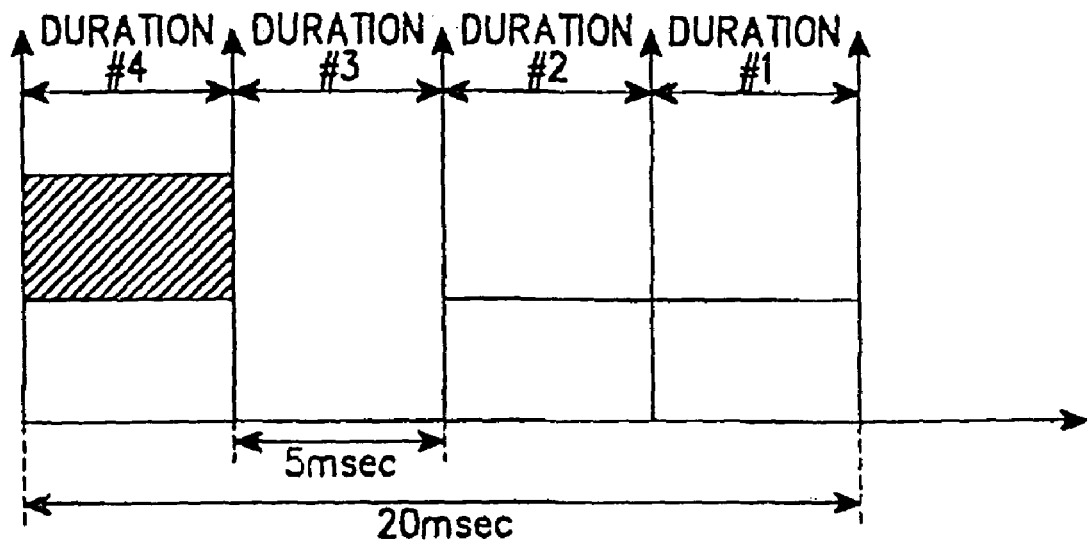
Figure 9D:
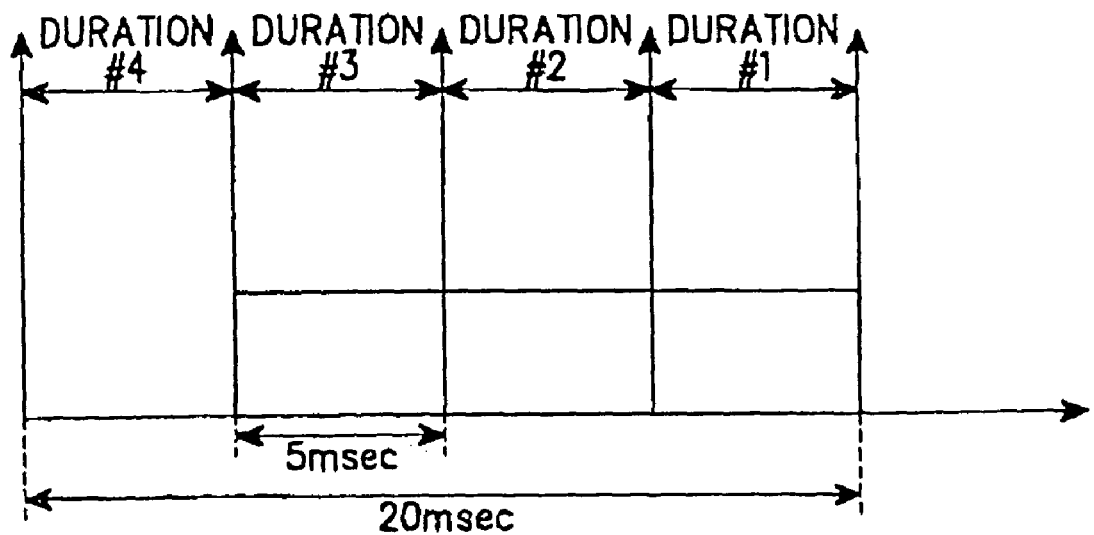

As shown in FIGS. 9A through 9D, since the 5 ms frame is one fourth the length of the 20 ms frame, there are four possible intermixing positions. That is, when the 20 ms frame is divided into four durations, the 5 ms frame can be intermixed with the 20 ms frame at any one of the four divided durations. In this example, the 20 ms frame data is lost for the interval in which the 5 ms frame data is transmitted. As stated above, the lost data of the 20 ms frame is restored through the decoding function of the error correction code at the receiver. In order to increase the receiving probability of the 20 ms frame, the transmitter increases the transmission power at the remaining durations following the lost 5 ms duration. For example, when the 5 ms frame is intermixed at the duration #1 of the 20 ms frame as shown in FIG. 9A, the power of the 20 ms frame is increased by about 33% at the following durations #2, #3 and #4. When the 5 ms frame is intermixed at the duration #2 of the 20 ms frame as shown in FIG. 9B, the power of the 20 ms frame is increased by about 50% at the following durations #3 and #4. When the 5 ms frame is intermixed at the duration #3 of the 20 ms frame as shown in FIG. 9C, the power of the 20 ms frame is increased by about 100% at the following duration #4. However, when the 5 ms frame is intermixed at the duration #4 of the 20 ms frame as shown in FIG. 9D, there is no way to compensate for the lost power. In this case, the decoding performance may be deteriorated as-compared to the above three cases.

Furthermore, in order to minimize the influence of the data loss, the interleaver for the 20 ms frame is designed such that the symbols corresponding to the 5 ms duration, to be deleted by performing row permutation, should be dispersed.

Next, an optimal interleaver may be considered through delete matrixes. Since one quarter of the 20 ms frame is replaced by the short message, i.e., one quarter of the 20 ms frame is "punctured", 144 (=576/4) bits should be punctured. Then, it should be determined how to delete the 144 bits among 576 bits, without deteriorating the decoding performance. There may exist so many number of cases according to the puncturing positions. In the embodiment, the respective parameters will be measured for some regular puncturing types. The followings are the delete matrixes according to the puncturing types:

Delete Matrix #1

$$D_1 = \begin{bmatrix} 0 & 1 & 1 & 1 & 0 & 1 & 1 & 1 & ... \\ 1 & 0 & 1 & 1 & 1 & 0 & 1 & 1 & ... \\ 1 & 1 & 0 & 1 & 1 & 1 & 0 & 1 & ... \end{bmatrix}$$

Delete Matrix #2

$$D_2 = \begin{bmatrix} 1 & 1 & 0 & 1 & 1 & 1 & 0 & 1 & ... \\ 1 & 0 & 1 & 1 & 1 & 0 & 1 & 1 & ... \\ 0 & 1 & 1 & 1 & 0 & 1 & 1 & 1 & ... \end{bmatrix}$$

Delete Matrix #3

$$D_3 = \begin{bmatrix} 0 & 1 & 1 & 1 & 1 & 1 & 0 & 1 & ... \\ 1 & 0 & 1 & 1 & 1 & 0 & 1 & 1 & ... \\ 1 & 1 & 0 & 1 & 0 & 1 & 1 & 1 & ... \end{bmatrix}$$

Delete Matrix #4

$$D_4 = \begin{bmatrix} 1 & 1 & 0 & 1 & 0 & 1 & 1 & 1 & ... \\ 1 & 0 & 1 & 1 & 1 & 0 & 1 & 1 & ... \\ 0 & 1 & 1 & 1 & 1 & 1 & 0 & 1 & ... \end{bmatrix}$$

In the delete matrix #1, "0" in the first row and the first column means that a first information bit encoded by a first generator polynomial is deleted (punctured), "1" in the first row and the second column means that the second information bit encoded by the first generator polynomial is not deleted, and "1" in the second row and the first column means that the first information bit encoded by the first generator polynomial is not deleted. Here, the free distance is 11 for the delete matrix #1, 12 for the delete matrix #2, 10 for the delete matrix #3 and 10 for the delete matrix #4. The free distance represents the minimum Hamming distance between the symbols and the Hamming distance represents the number of the skewed bits between the encoded symbols. As the Hamming distance is getting greater, the decoding performance is increased. Accordingly, the delete matrixes #1 and #2 have the better properties in terms of the free distance, as compared with the delete matrixes #3 and #4. Further, although the delete matrix #2 has the better property than that of the delete matrix #2 in terms of the free distance, the delete matrix #2 has the better property than that of the delete matrix #1 in terms of the distribution of the Hamming distance between the encoded symbols.

Shown in Table 5 is an interleaver designed to have the puncturing form according to the delete matrix #1.

TABLE 5

32 × 18 arrangement of the encoded symbols 1 32 65 97 129 161 193 225 257 289 321 353 385 417 449 481 513 545
5 37 69 101 133 165 197 229 261 293 325 357 389 421 453 485 517 549
9 41 73 105 137 169 201 233 265 297 329 361 393 426 457 489 521 553
13 45 77 109 141 173 205 237 269 231 333 365 397 428 461 493 525 557
17 49 81 113 145 181 209 241 273 235 337 369 401 433 465 497 529 561
21 53 85 117 149 181 213 245 277 309 341 373 405 437 469 501 533 566
25 57 89 121 153 185 217 249 281 313 345 377 409 441 473 505 537 569
29 61 93 125 157 198 221 253 285 317 349 381 413 445 477 509 541 673
2 34 66 98 130 162 194 226 258 290 322 354 386 418 405 482 514 546
6 38 70 102 134 166 198 230 262 294 326 358 390 422 454 486 518 550
10 42 74 106 138 170 202 234 266 298 330 362 394 426 459 490 522 554
14 46 78 110 142 174 206 237 270 302 334 366 398 430 462 494 526 558
18 50 82 114 146 178 210 241 274 306 338 370 402 434 466 498 530 562
22 54 86 118 150 182 214 245 278 310 342 374 406 438 470 502 534 566
26 58 90 122 154 186 218 249 282 314 346 378 410 442 474 506 538 570
30 62 94 126 158 190 222 253 286 318 350 382 414 446 478 510 542 574
3 36 67 99 131 163 195 227 259 291 323 356 387 419 451 483 515 547
7 40 71 103 135 167 199 231 263 295 327 359 391 423 465 487 519 651
11 43 75 107 139 171 203 235 267 299 331 363 395 427 459 491 523 655
15 47 79 111 143 175 207 239 271 303 335 370 399 431 463 495 527 659
19 51 83 115 147 179 211 243 275 307 339 374 403 435 467 499 531 663
23 55 87 119 151 183 215 247 279 311 343 375 407 439 470 503 535 667
27 59 91 123 155 187 219 251 283 315 347 379 411 443 475 507 539 671
31 63 95 127 159 191 223 255 287 319 351 383 415 447 479 511 543 675
4 36 68 100 132 164 196 228 260 292 324 356 388 420 452 484 516 548
8 40 72 104 136 168 200 232 264 296 328 360 392 424 456 488 520 552
12 44 76 108 140 172 204 236 268 300 332 364 396 428 460 492 524 556
16 48 80 112 144 176 208 240 272 304 336 368 400 432 464 496 528 560
20 52 84 116 148 180 212 244 276 308 340 372 404 436 468 500 532 564
24 56 88 120 152 184 216 248 280 312 344 376 408 440 472 504 536 568
28 60 92 124 156 188 220 252 284 316 348 380 412 444 476 508 540 572
32 64 96 126 160 192 224 256 288 320 352 384 416 448 480 512 544 576

Figure 10A:
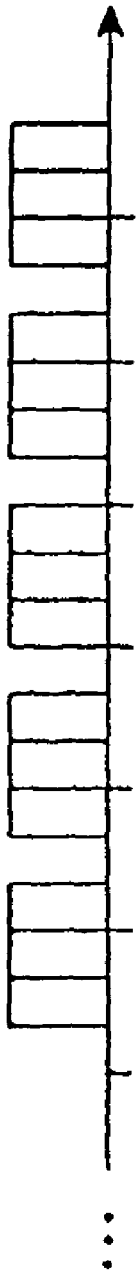
FIGS. 10A through 10D show frame transmission pattern according to the intermixing methods.
Figure 10B:
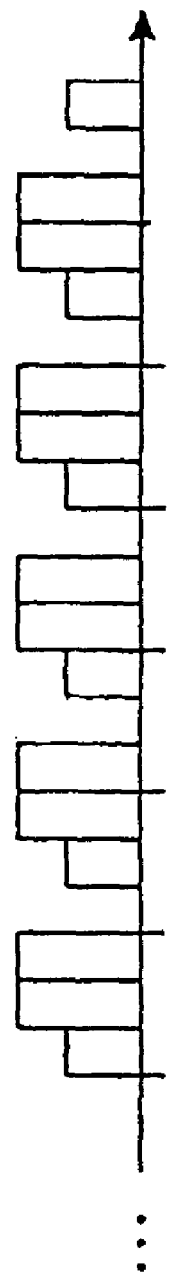
Figure 10C:
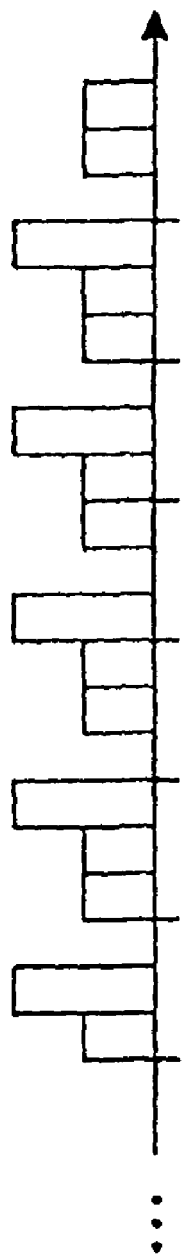
Figure 10D:
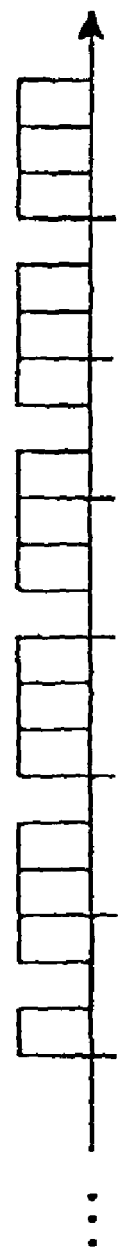

FIGS. 10A through 10D illustrate the symbol forms of the 20 ms frame transmitted by the interleaver designed according to the delete matrix #1 for the respective intermixing methods. Specifically, FIG. 10A illustrates the case where the 5 ms frame is intermixed with the 20 ms frame at duration #1. With respect to the information bits 1, 2, 3, 4 and 5, the puncturing is performed in the order of first symbol data $S_{10}$, second symbol data $S_{21}$, third symbol data $S_{32}$, fourth symbol data $S_{40}$ and fifth symbol data $S_{51}$ according to the delete matrix #1. Here, the symbols have the equivalent powers as illustrated in the figure. FIG. 10B illustrates the case where the 5 ms frame is intermixed with the 20 ms frame at the duration #2. The puncturing format is similar to that of FIG. 10A, and the respective symbols have different power according to the interval (duration) to which they belong. That is, the symbols belonging to duration #1 are transmitted at the original power, and the symbols belonging to the durations #3 and #4 are transmitted at a 50% increased power level as compared with the original power. FIG. 10C illustrates the case where the 5 ms frame is intermixed with the 20 ms frame at duration #3. The puncturing format is similar to that described above, and the respective symbols have different powers according to the durations to which they belong. For example, the symbols of duration #2 and #3 have the original power, and the symbols belonging to the duration #4 have about twice as much power as compared with the original power. Finally, FIG. 10D illustrates the case where the 5 ms frame is intermixed with the 20 ms frame at the duration #4. The puncturing format is the same as that described above, and the symbols have the original power.

Figure 11:
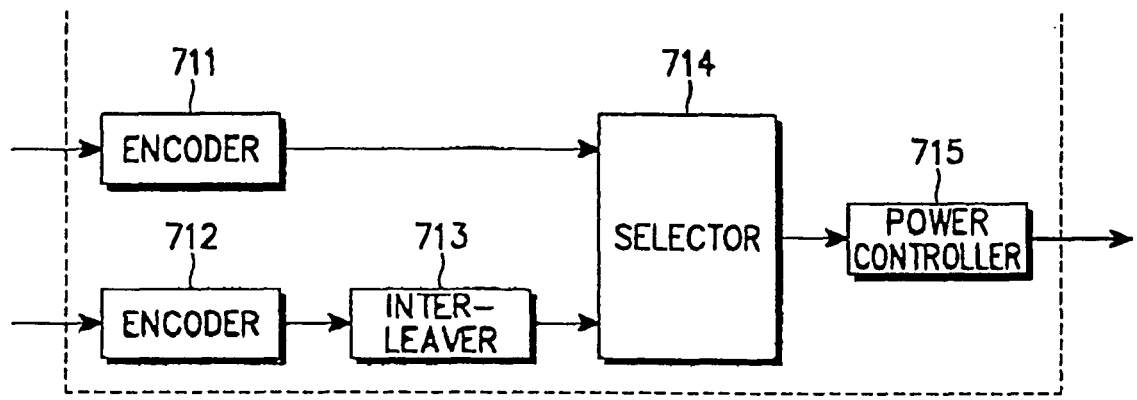
FIG. 11 is a diagram illustrating a scheme for intermixing frames of multiple lengths according to an embodiment of the present invention.

FIG. 11 illustrates a scheme for intermixing frame messages of different lengths according to an embodiment of the present invention. In the figure, an interleaver 713 is designed to have the property of Table 5 according to the delete matrix #1. Therefore, the specification will present the scheme designed according to the delete matrix #1, by way of example.

Referring to FIG. 11, an encoder 711 generates an encoded first length frame message of 5 ms, and an output of the encoder 711 is interleaved through a undepicted interleaver. An encoder 712 generates an encoded second length frame message of 20 ms, and the interleaver 713 interleaves the encoded 20 ms frame message output from the encoder 712 to rearrange the symbols within the frame in such a manner that the corresponding symbols are punctured according to the delete matrix #1. A selector 714 selects the output of the encoder 711 or the output of the interleaver 713 according to the frame select signal. That is, the selector 714 selects the output of the encoder 711 in response to the first frame select signal, and selects the output of the interleaver 713 in response to the second frame select signal. A multiplexer can be used for the selector 714.

A power controller 715 controls a gain of the signal output from the selector 714 according to the gain control signal. That is, the power controller 715 outputs the input signal, as it is, without gain control in response to the first gain control signal, increases the gain of the input signal to increase the output power in response to the second gain control signal, and controls the gain of the input signal to zero in response to the third gain control signal. When the gain is zero, there is no output signal so that the output of the channel is cut off.

Now, a description will be made as to an operation of intermixing the 5 ms frame message with the 20 ms frame message with reference to FIG. 11.

The encoder 711 encodes the first frame data input and generates the first length frame message to the selector 714. The encoder 712 encodes the second data input and generates the second length frame message to the interleaver 713. The interleaver 713 then rearranges the symbols within the second length frame message so that the symbols are punctured in accordance with the delete matrix #1 for the respective cases of FIGS. 9A to 9D. The structure of the interleaver 713 is illustrated in FIG. 12.

Figure 12:
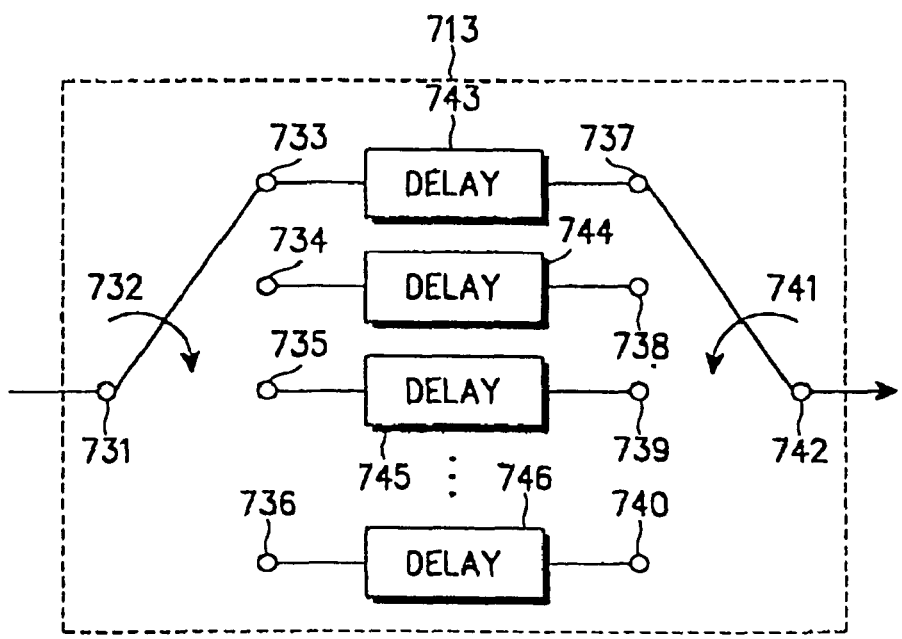
FIG. 12 is a diagram illustrating an interleaver (713) in a second length frame message generator of FIG. 11.

Referring to FIG. 12, the interleaver 713 consists of 32 delays 743-746. When the second length frame message is output from the encoder 712, a switch 732 connects a node 731 to a node 733 to output a first symbol to the delay 743, and connects the node 731 to a node 734 to output a second symbol to the delay 744. In this manner, after a 32nd symbol is output to the delay 746, the switch 731 connects again the node 731 to the node 733 to output a 33rd symbol to the delay 743. By repeating this process, 18 symbols are stored in the respective delays. Thereafter, in accordance with the interleaving function of Table 5, a switch 741 connects a node 742 to a node 737 to output the symbols stored in the delay 743. Next, the switch 741 connects the node 742 to an output node of the fifth delay to output the symbols stored in the fifth delay. That is, the symbols stored in the first, fifth, ninth, thirteenth, seventeenth, twenty-first, twenty-fifth and twenty-ninth delays are output in sequence for the duration #1 of the 20 ms frame; the symbols stored in the second, sixth, tenth, fourteenth, eighteenth, twenty-second, twenty-sixth and thirtieth delays are output in sequence for the duration #2 of the 20 ms frame; the symbols stored in the third, seventh, eleventh, fifteenth, nineteenth, twenty-third, twenty-seventh and thirty-first delays are output in sequence for the duration #3 of the 20 ms frame; and the symbols stored in the fourth, eighth, twelfth, sixteenth, twentieth, twenty-fourth, twenty-eighth and thirty-second delays are output in sequence for the duration #4 of the 20 ms frame. The values output from the interleaver 713 are input to the selector 714 and intermixed with 5 ms frame applied to another input end of the selector 714.

Figure 13:
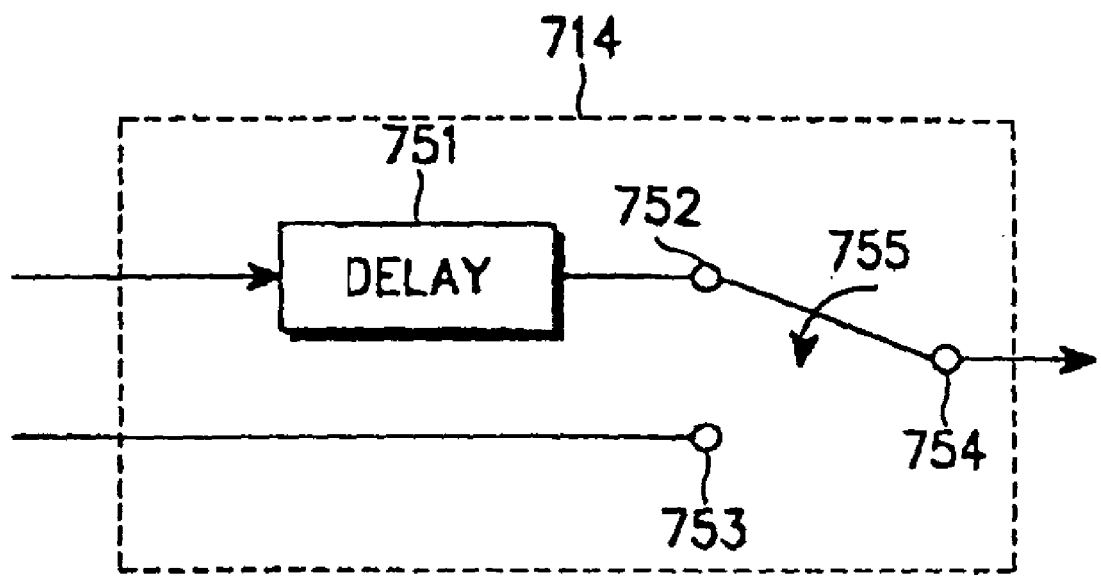
FIG. 13 is a diagram illustrating a selector (714) of FIG. 11.

FIG. 13 illustrates the structure of the selector 714. If the 5 ms frame is input while a switch 755 connects a node 754 to a node 753 to output the 5 ms frame for the duration #1, the input 5 ms frame is temporarily delayed by the delay 751. After passage of the duration #1, the switch 755 connects the node 754 to a node 752 to output the delayed 5 ms frame symbols for the duration #2. Thus, the symbols of the 20 ms frame are deleted at the duration #2. After passage of the duration #2, the switch 755 connects again the node 754 to the node 753 to output the remaining 20 ms frame symbols. Such intermixed frames are input to the power controller 715 which outputs the symbols of the 5 ms frame, as they are, and outputs the symbols of the remaining 20 ms frame with an increased power. As a result, the encoded 20 ms frame output from the encoder 712 is punctured as shown in the delete matrix #2.

More specifically, the selector 714 receives in sequence the symbols output from the first, fifth, ninth, thirteenth, seventeenth, twenty-first, twenty-fifth and twenty-ninth delays in the interleaver 713 and outputs the received symbols to the power controller 715, in response to a first select signal. Further, the selector 714 outputs the symbols of the 5 ms frame delayed in the delay 751 to the power controller 715 in response to a second select signal. Then, the selector 714 receives in sequence the symbols output from the third, seventh, eleventh, fifteenth, nineteenth, twenty-third, twenty-seventh, thirty-first, fourth, eighth, twelfth, sixteenth, twentieth, twenty-fourth, twenty-eighth and thirty-second delays in the interleaver 713 and outputs the received symbols to the power controller 715, in response to the first select signal. That is, it implies that the symbols of the second, sixth, tenth, fourteenth, eighteenth, twenty-second, twenty-sixth and thirtieth delays corresponding to the duration #2 of the 20 ms frame are deleted.

A performance of such a frame intermixing scheme depends on the generator polynomial of the encoders and the interleaver. When the puncturing is performed according to several types of the delete matrixes with respect to one generator polynomial, the delete matrix having the good performance measurement is selected for the respective cases and then, the interleaver is designed accordingly.

Figure 14A:
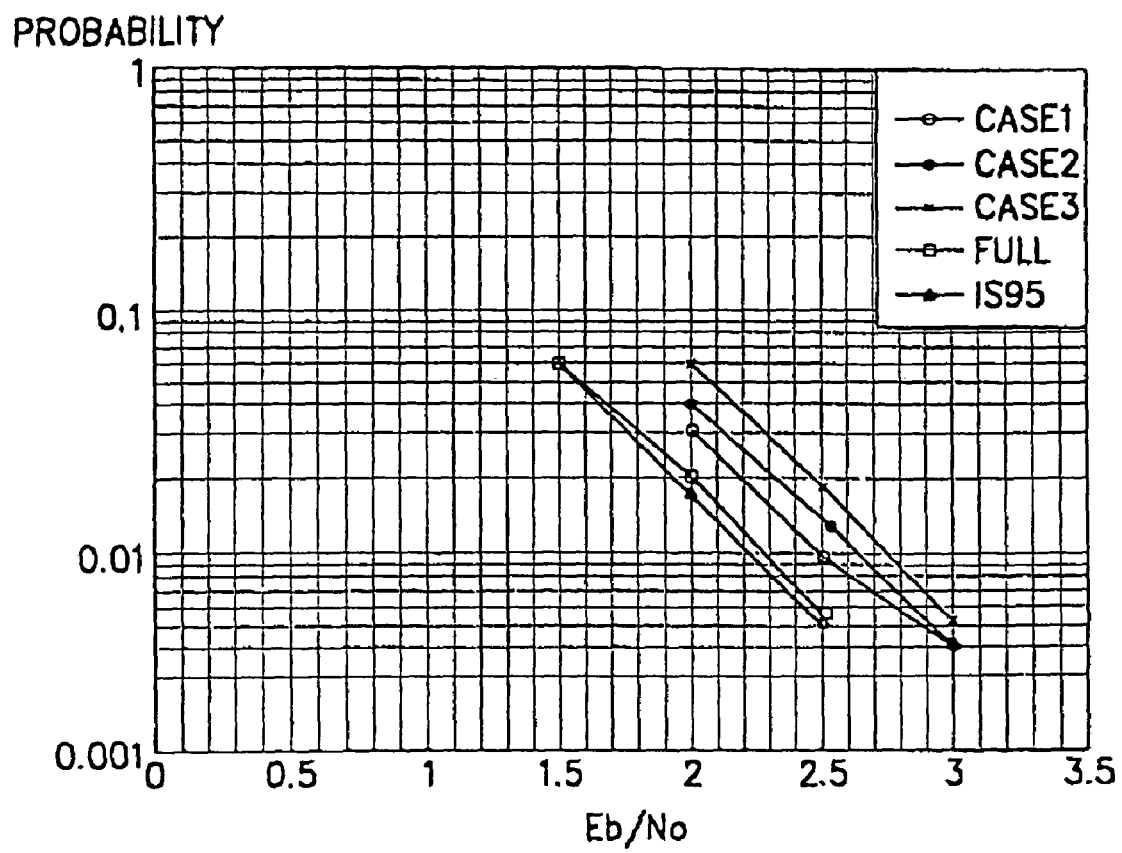
FIGS. 14A and 14B are diagrams illustrating performances of punctured frames using matrix 1 and matrix 2, respectively.
Figure 14B:
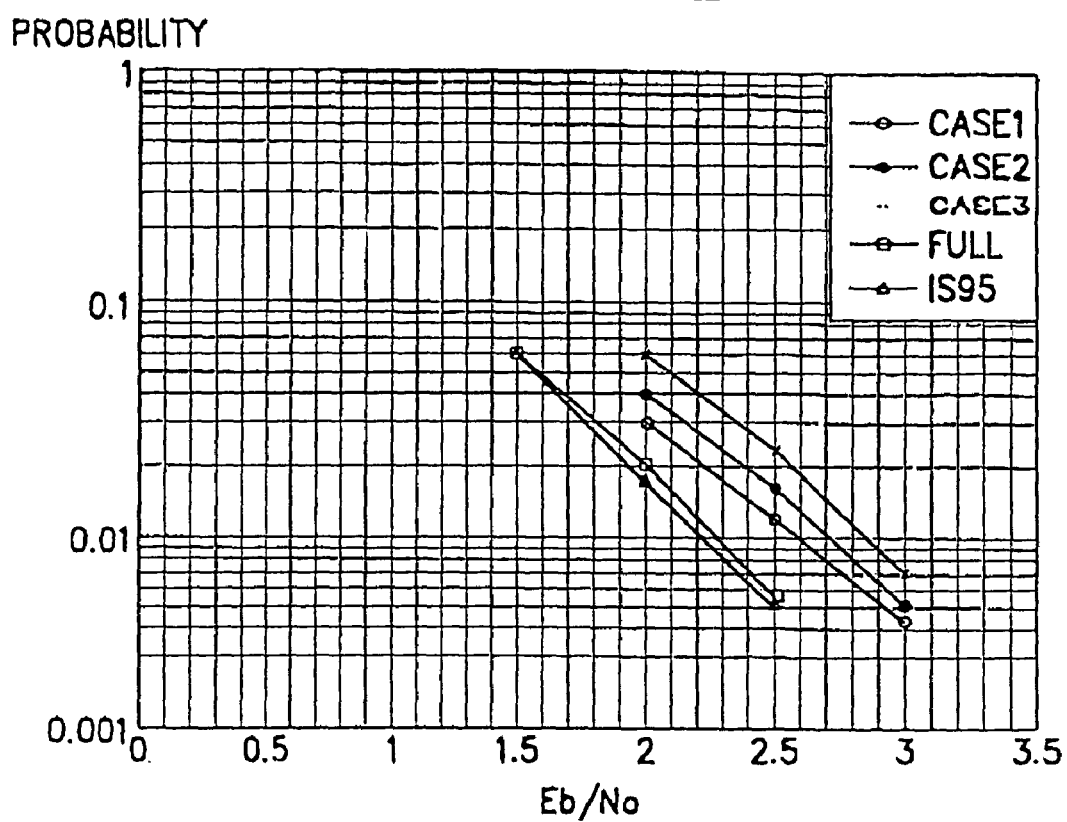

FIGS. 14A an 14B illustrate the performances of the punctured frames using the delete matrix #1 and the delete matrix #2, respectively. More specifically, FIG. 14A illustrates the performances of the interleaver designed using the delete matrix #1, for the respective intermixed cases #1 to #3. FIG. 14B illustrates the performances of the interleaver designed using the delete matrix #2, for the respective intermixed cases #1 to #3.

FIGS. 14A and 14B both show that the intermixed case #1 provides the best performance and the intermixed case #3 provides the worst performance. For example, Table 6 shows a signal-to-noise ratio (Eb/No) for the respective intermixed cases, when an error probability is 0.01(=1%).

TABLE 6

|  | Eb/No for the error probability of 0.01 | | | |
| --- | --- | --- | --- | --- |
|  | Case #1 | Case #2 | Case #3 | Remarks |
| Delete Matrix #1 | 2.5 dB | 2.6 dB | 2.7 dB | 0.5 dB |
| Delete Matrix #2 | 2.6 dB | 2.7 dB | 2.8 dB | 0.6 dB |

From Table 6, it is noted that better performance is obtained when using the delete matrix #1 rather than the delete matrix. #2. Further, case #1 is superior in performance to case #2, and case #2 is superior to case #3. In this example, the numerals in Remarks of Table 6 represent the signal-to-noise ratio differences between the systems having the best performance and the worst performance, including the IS-95 system. Since the system having the higher performance has the reduced performance difference, the higher performance can be expected when using the delete matrix #1 rather than the delete matrix #2. Accordingly, in the preferred embodiment, the symbol distributor is designed according to the delete matrix #1 in the frame matrix scheme.

As described above, when the 5 ms frame message and the 20 ms frame message are output simultaneously, the dedicated control channel transmission device outputs the 5 ms frame message at the corresponding time and thereafter, transmits the remaining 20 ms frame message with the increased power. Here, since the frame message was encoded at the 1/3 coding rate in the encoding process, the receiver can perform the error correction with respect to the data loss.

To improve the error correction capability, the second interleaver 522 should be so designed as to uniformly disperse the encoded data. Although FIGS. 8A and 8B show the examples of intermixing the 5 ms frame message and the 20 ms frame message, it can be understood that the frame message transmission capability is excellent even in the case where the 5 ms frame message and the 20 ms frame message are output successively.

FIG. 5 illustrates the structure of the dedicated channel transmission device for the forward link (from the base station to the mobile station). The dedicated control channel transmission device for the forward link should perform a PCB insertion operation for controlling transmission power of the mobile station. However, a dedicated channel transmission device for the reverse link (from the mobile station to the base station) need not perform the PCB puncturing operation. Accordingly, the dedicated control channel transmission device for the reverse link (mobile station) has a similar structure to that of the dedicated control channel transmission device for the forward link (base station), except for the PCB insertion scheme, the S/P converter (for multicarrier), the spreader structure and the encoding rate of the convolutional encoder. In the example, the encoding rate of the forward link encoder is 1/3 and the encoding rate of the reverse link encoder is 1/4.

In transmitting the frame message using the reverse dedicated channel, the dedicated channel transmission device for the reverse link also determines the frame length according to the size of the frame message and transmits the frame message according to the determination. Further, the dedicated channel transmission device for the reverse link examines presence/absence of the frame message to transmit through the reverse dedicated channel, to suppress an output of the reverse dedicated channel when there is no frame message to transmit and to form an output path for the reverse dedicated channel only when there is an actual frame message to transmit.

Figure 7:
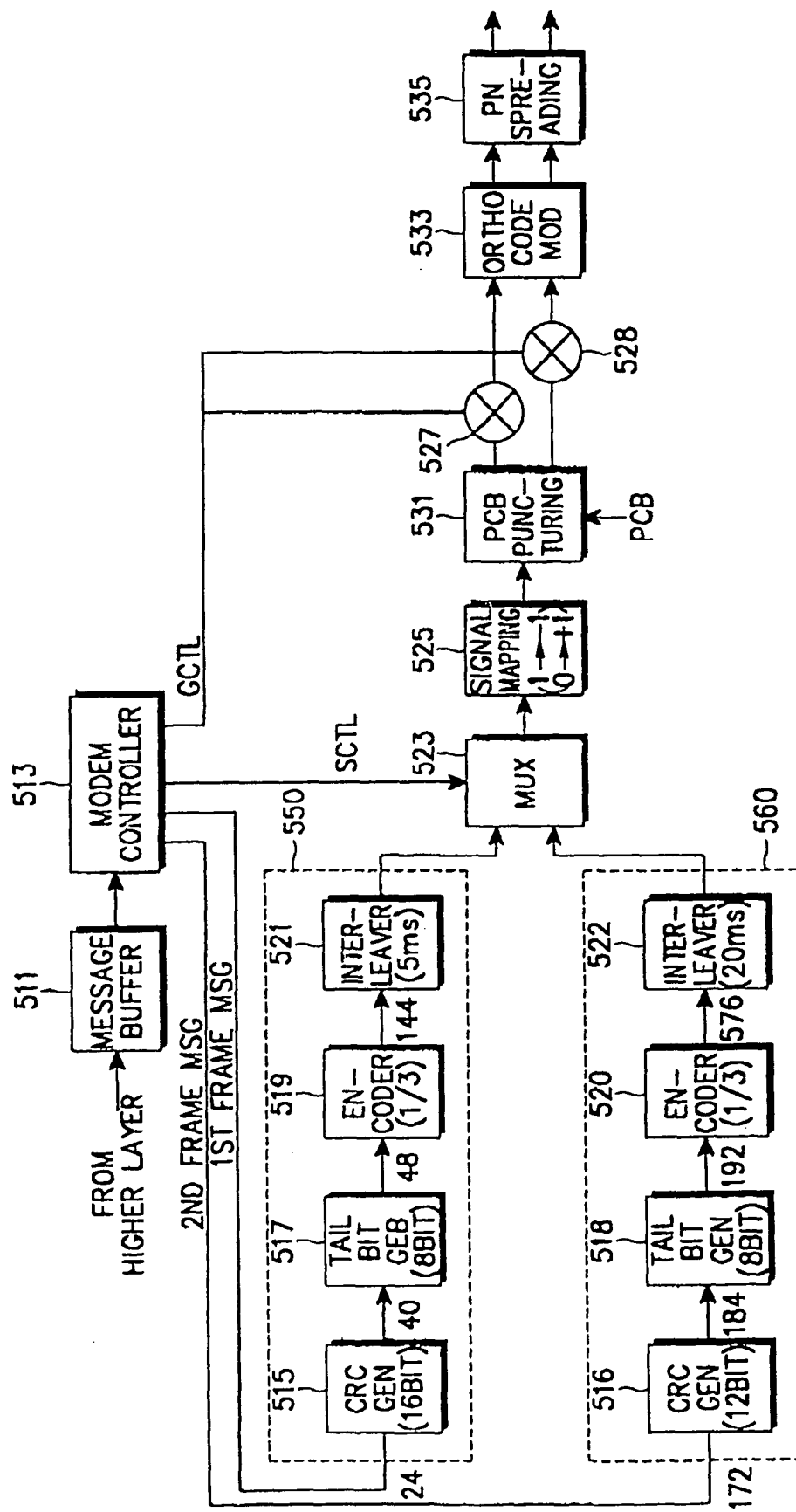
FIG. 7 is a diagram illustrating a transmission device for the reverse control dedicated control channel in the mobile communication system according to an embodiment of the present invention.

Shown in FIG. 5 is the multicarrier dedicated channel transmission device for the forward link and shown in FIG. 7 is the single carrier dedicated channel transmission device for the reverse link. Accordingly, it is also possible to construct a single carrier dedicated channel transmission device for the forward link and a multicarrier dedicated channel transmission device for the reverse link.

A device for receiving the control signals transmitted through the forward or reverse dedicated channel should determine the length of the frame message to process the control signal. The dedicated channel reception device for the forward or reverse link can be constructed as shown in FIG. 15.

Figure 15:
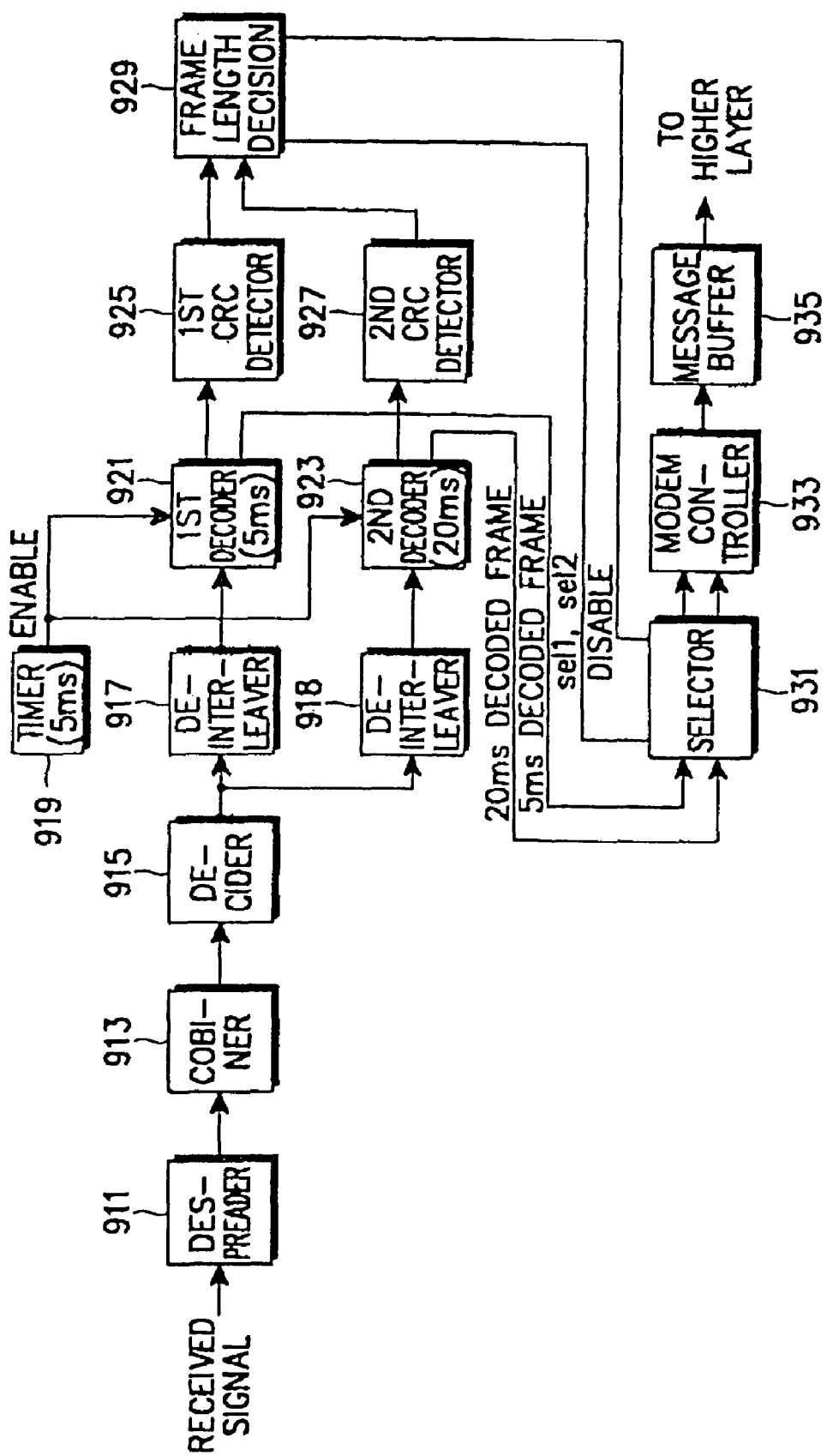
FIG. 15 a diagram illustrating a reception device for the dedicated channel in the CDMA communication system according another embodiment of the present invention.

Referring to FIG. 15, a despreader 911 despreads a received signal using a PN sequence and an orthogonal code to receive a dedicated channel signal. A diversity combiner 913 combines the multipath signal output from the despreader 911. A soft decision generator 915 quantizes the received signal into a multilevel digital value to decode the received signal. A first deinterleaver 917 sized to process the 5 ms frame message, deinterleaves the 5 ms frame message interleaved during transmission to rearrange the bits in the original state. A second deinterleaver 918 sized to process the 20 ms frame message, deinterleaves the 20 ms frame message interleaved during transmission to rearrange the bits in the original state.

A timer 919 generates a control signal for decoding the data received through the dedicated channel at fixed periods. Here, the timer 919 is a 5 ms timer capable of decoding the 5 ms frame. A first decoder 921 is enabled by the control signal output from the timer 919 and decodes the frame message output from the first deinterleaver 917. The first decoder 921 decodes the first length frame message of 5 ms. A second decoder 923 is enabled by the control signal output from the timer 919 and decodes the frame message output from the second deinterleaver 918. The second decoder 923 decodes the second length frame message of 20 ms. A first CRC detector 925 receives an output of the first decoder 921 and checks the CRC for the 5 ms frame. A second CRC detector 927 receives an output of the second decoder 923 and checks the CRC for the 20 ms frame. Here, the first and second CRC detectors 925 and 927 output a true signal 1 or a false signal 0 as the result signal. Although the present invention has been described with reference to an embodiment which determines the length of the received frame message by detecting the CRC bit, it is also possible to determine the frame length and also whether the frame exists or not by calculating the energy of the signals received at the first and second frame message durations.

A frame length decision block 929 analyzes the result signals output from the first and second CRC detectors 925 and 927 to decide the length of the frame message received through the dedicated channel. The frame length decision block 929 generates a select signal se11 for selecting the first decoder 921 when the first CRC detector 925 outputs the true signal, generates a select signal se12 for selecting the second decoder 923 when the second CRC detector 927 outputs the true signal, and generates a DISABLE signal for shutting off the outputs of the first and second decoders 921 and 923 when the first and second CRC detectors 925 and 927 both generate the false signal.

A selector 931 selects the decoded data output from the first and second decoders 921 and 923 according to the output signals of the frame length decision block 929. That is, the selector 931 selects the output of the first decoder 921 when the received frame is a 5 ms frame, selects the output of the second decoder 923 when the received frame is a 20 ms frame, and shuts off the outputs of both the first second decoders 921 and 923 for the period in which the frame message is not received.

A modem controller 933 stores the received frame message of the decoded data output from the selector 931 in a message buffer 935. The upper layer processor then reads and processes the control message stored in the message buffer 935. In addition, when the first length frame message is intermixed with the second length frame message, the modem controller 933 outputs the first length frame message in response to the select signal se11 and the second length frame message in response to the select signal se12.

Now, operation of the dedicated channel reception device will be described hereinbelow with reference to FIG. 15. The despreader 911 receives the control signal through the dedicated channel, and despreads the received control signal with the PN sequence. The control signals received through the dedicated channel are restored to the original frame message by way of the reverse process of transmission. Here, the first and second deinterleavers 917 and 918 are sized to process the 5 ms and 20 ms frame messages, respectively.

Thereafter, in the base station and the mobile station, the first decoder 921 decodes the 5 ms frame and the second decoder 923 decodes the 20 ms frame to process the frame message. The first and second CRC detectors 925 and 927 then perform CRC checking for the decoded data output from the first and second decoders 921 and 923, respectively, and output the result values to the frame length decision block 929. The frame length decision block 929 then decides the frame length of the received frame message according to the CRC check results.

When the intermixed frame messages of the first length frame message and the second length frame message are received, the first CRC detector 925 and the second CRC detector 927 alternately generate the true signal for the 20 ms duration. In this case, the frame length decision block 929 generates the select signals se11 and se12 according to the output signals of the first and second CRC detectors 925 and 927. The selector 931 then selects the outputs of the first and second decoders 921 and 923 according to the select signals se11 and se12. The modem controller 933 also selectively outputs the first length frame message and the second length frame message to the message buffer 935 according to the select signals se11 and se12 from the frame length decision block 929. That is, when received the intermixed frame message, the dedicated channel reception device determines the frame length and separately processes the first length frame message and the second length frame message according to the determination.

When it is assumed that CRC5 denotes the CRC check result for the 5 ms frame and CRC20 denotes the CRC check result for the 20 ms frame, the frame length decision block 929 will generate the select signals as shown in Table 7.

TABLE 7

| CRC Detector | | Frame Length | | Decision |
|---|---|---|---|---|
| CRC5 | CRC20 | Decision Block | Selector | Results |
| True | False | sel1 | 1st Decoder Selected | 5 ms Frame |
| False | True | sel2 | 2nd Decoder Selected | 20 ms Frame |
| False | False | DISABLE | Decoder Output Off | No Frame |
| True | True | X | X | X |

As shown in Table 7, when CRC5 and CRC20 are both detected (i.e., true), the frame length decision block does not determine the corresponding state. However, when the CRC5 and CRC20 are both true, it is also possible to determine the received frame as the 5 ms frame and to determine both received frames or disregard the two inputs.

Figure 16:
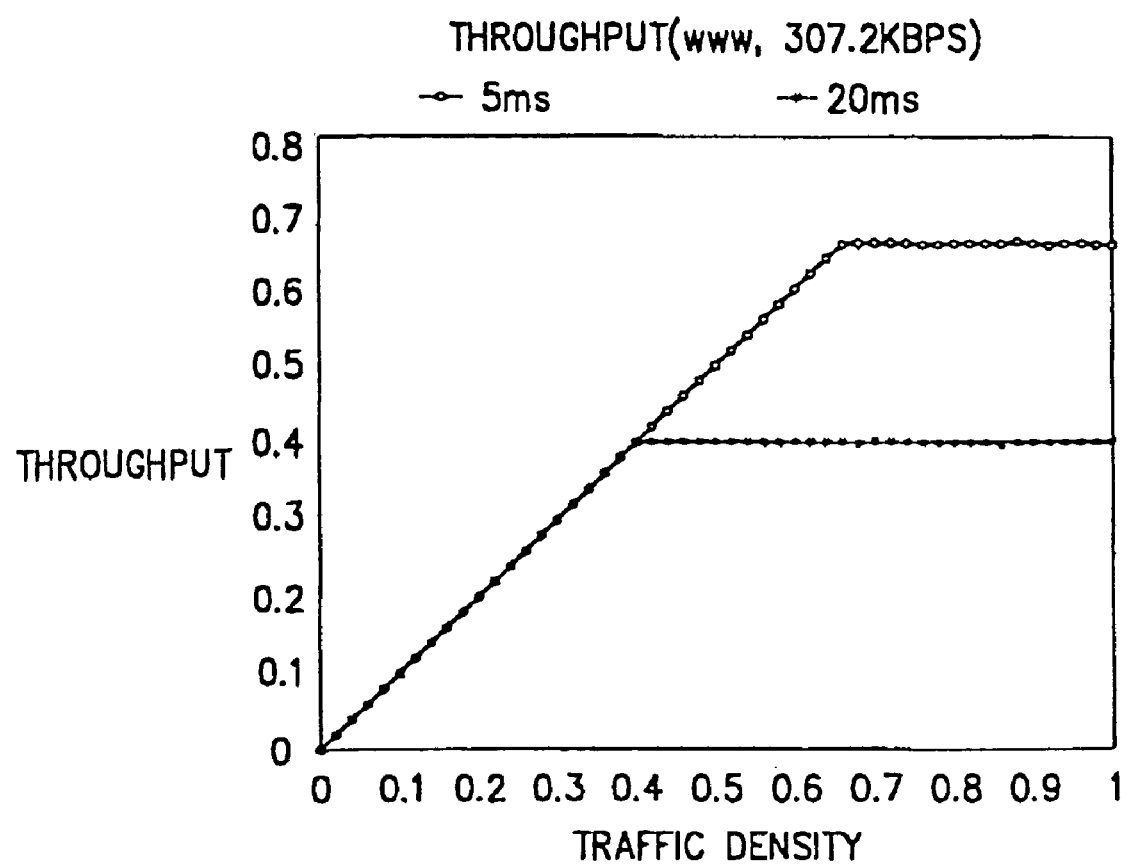
FIG. 16 is a diagram illustrating simulation results for a 5 ms frame message and a 20 ms frame message according to an embodiment of the present invention.

Referring to FIG. 16, a simulation result for processing variable length frame messages received through the dedicated channel according to the present invention is illustrated. A comparison result between the throughputs when the 5 ms frame is used and when the 20 ms frame is used for the dedicated channel. Here, the forward packet traffic channel has a data rate 307.2 Kbps, a 20 ms fixed frame and 1% FER (Frame Error Rate).

As described above, the CDMA mobile communication system according to the present invention has the following advantages:

(1) It is possible to increase the throughput and decrease the traffic delay of the dedicated channel, by generating the different length frame messages according to the size of the message transmitted on the dedicated channel;

(2) Use of the dedicated control channel is discontinuously controlled according to presence/absence of the frame message to transmit. Thus, the radio capacity may be increased by the DTX mode transmission;

(3) When plural frames messages of different lengths are generated, the generated frame messages are intermixed with each other, to thereby reduce the transmission time of the frame messages.

While the invention has been shown and described with reference to a certain preferred embodiment thereof, it will be understood by those skilled in the art that various changes in form and details may be made therein without departing from the spirit and scope of the invention as defined by the appended claims. For instance, while the embodiments above have been described in connection with a CDMA communication system, the invention is contemplated for use with other spread spectrum or non-spread spectrum wireless telecommunication systems as well.

What is claimed is:

1. A transmission device for a wireless communication system, comprising:
 a controller for receiving a first data frame, either coincident with a second data frame or during transmission of the second data frame, to be transmitted, comparing a duration of the first data frame with a duration of the second data frame, and preempting transmission of one of the first data frame and the second data frame having a longest duration based on a result of the comparing, in order to first transmit one of the first data frame and the second data frame having a shortest duration; and
 a multiplexer for starting or resuming transmission of the one of the first data frame and the second data frame having the longest duration, after transmission of the one of the first data frame and the second data frame having the shortest duration.

2. The transmission device of claim 1, further comprising a power controller for increasing a transmission power of the one of the first data frame and the second data frame having the longest duration, to be higher than that of the one of the first data frame and the second data frame having the shortest duration.

3. The transmission device of claim 1, wherein the first data frame has a frame length of 5ms and the second data frame has a frame length of 20ms.

4. The transmission device of claim 1, further comprising:
 a data frame generator for encoding second input data of a second bit stream that is longer than a first bit stream to generate the second data frame.

5. The transmission device of claim 4, wherein the second data frame generator comprises:
 a Cyclic Redundancy Check (CRC) generator for generating CRC bits according to the second input data of a second frame length;
 a tail bit generator for generating tail bits and adding the generated tail bits to an output of the CRC generator;
 a channel encoder for encoding a tail bit-added second frame data at a predefined coding rate; and
 an interleaver for interleaving the encoded data frame by the second frame length.

6. The transmission device of claim 1, further comprising:
 a spreader for spreading an output of the multiplexer.

7. The transmission device of claim 6, wherein the interleaver uniformly distribute symbols generated by encoding one data bit over the respective durations of the whole frame.

8. The transmission device of claim 7, wherein the interleaver is designed according to a delete matrix given by $$D_1 = \begin{bmatrix} 0 & 1 & 1 & 1 & 0 & 1 & 1 & 1 & \ldots \\ 1 & 0 & 1 & 1 & 1 & 0 & 1 & 1 & \ldots \\ 1 & 1 & 0 & 1 & 1 & 1 & 0 & 1 & \ldots \end{bmatrix}.$$

9. The transmission device of claim 7, wherein the spreader comprises:
 an orthogonal code spreader for spreading the one of the first data frame and the second data frame having the shortest duration output from the multiplexer with an orthogonal code for a dedicated control channel; and
 a Pseudo-random Noise (PN) spreader for spreading an output of the orthogonal code spreader with a PN sequence.

10. The transmission device of claim 1, wherein the first data frame and the second data frame are control data frames.

11. A transmission method in a wireless communication system, comprising:
 receiving a first data frame to be transmitted, wherein the first data frame is received coincident with a second data frame or during transmission of the second data frame;
 comparing a duration of the first data frame with a duration of the second data frame;
 preempting transmission of one of the first data frame and the second data frame having a longest duration based on a result of the comparing, in order to first transmit one of the first data frame and the second data frame having a shortest duration; and
 starting or resuming transmission of the one of the first data frame and the second data frame having the longest duration, after transmission of the one of the first data frame and the second data frame having the shortest duration.

12. The data transmission method of claim 11, further comprising:
increasing a transmission power of the one of the first data frame and the second data frame having the longest duration, to be higher than that of the one of the first data frame and the second data frame having the shortest duration.

13. The data transmission method of claim 11, wherein the first frame has a frame length of 5ms and the second frame has a frame length of 20ms.

14. The data transmission method of claim 11, further comprising:
encoding second input data of a second bit stream that is longer than a first bit stream to generate the second data frame.

15. The data transmission method of claim 14, wherein the second data frame generation step comprises:
generating Cyclic Redundancy Check (CRC) bits according to second data input of a second frame length;
generating tail bits;
adding the generated tail bits to the CRC bit-added second data frame;
encoding the tail bit-added second data frame at a predefined coding rate; and
interleaving symbols of the encoded second data frame by the second frame length.

16. The data transmission method of claim 15, wherein symbols generated by encoding one data bit are uniformly distributed over respective durations of the second data frame, in said interleaving step.

17. The data transmission method of claim 16, wherein the symbols are distributed according to a delete matrix given by $$D_1 = \begin{bmatrix} 0 & 1 & 1 & 1 & 0 & 1 & 1 & 1 & ... \\ 1 & 0 & 1 & 1 & 1 & 0 & 1 & 1 & ... \\ 1 & 1 & 0 & 1 & 1 & 1 & 0 & 1 & ... \end{bmatrix}.$$

18. The data transmission method of claim 11, wherein the transmission step comprises the steps of:
spreading the one of the first data frame and the second data frame having the shortest duration with an orthogonal code; and
spreading an orthogonal spread signal with a Pseudo-random Noise (PN) sequence.

19. The data transmission method of claim 11, wherein the first data frame and the second data frame are control data frames.

* * * * *

UNITED STATES PATENT AND TRADEMARK OFFICE
CERTIFICATE OF CORRECTION

PATENT NO. : 8,249,040 B2
APPLICATION NO. : 10/726087
DATED : August 21, 2012
INVENTOR(S) : Young-Ky Kim et al.

Page 1 of 1

It is certified that error appears in the above-identified patent and that said Letters Patent is hereby corrected as shown below:

On the Title page item:

(30) Foreign Application Priority Data:

"Mar. 14, 1998 (KR) ........................1999-9389"

should be

--Mar. 14, 1998 (KR) ........................ 1998-9389--.

Signed and Sealed this
Sixteenth Day of July, 2013

Teresa Stanek Rea
*Acting Director of the United States Patent and Trademark Office*